United States Patent
Smith et al.

(10) Patent No.: US 10,685,580 B2
(45) Date of Patent: Jun. 16, 2020

(54) APPARATUS, ENGINE, SYSTEM AND METHOD OF PROVIDING SIMULATION OF AND TRAINING FOR THE OPERATION OF HEAVY EQUIPMENT

(71) Applicants: Steven J. Smith, Tulsa, OK (US); Randall A. Palmer, Broken Arrow, OK (US); Justin M. Rempel, Tulsa, OK (US); Jack E. Cochran, Wagoner, OK (US); Kevin L. Greer, Bixby, OK (US); Douglas J. Middleton, Tulsa, OK (US)

(72) Inventors: Steven J. Smith, Tulsa, OK (US); Randall A. Palmer, Broken Arrow, OK (US); Justin M. Rempel, Tulsa, OK (US); Jack E. Cochran, Wagoner, OK (US); Kevin L. Greer, Bixby, OK (US); Douglas J. Middleton, Tulsa, OK (US)

(73) Assignee: FlightSafety International Inc., Flushing, NY (US)

( * ) Notice: Subject to any disclaimer, the term of this patent is extended or adjusted under 35 U.S.C. 154(b) by 255 days.

(21) Appl. No.: 15/383,967

(22) Filed: Dec. 19, 2016

(65) Prior Publication Data
US 2017/0200386 A1    Jul. 13, 2017

Related U.S. Application Data

(60) Provisional application No. 62/277,823, filed on Jan. 12, 2016, provisional application No. 62/273,909, filed on Dec. 31, 2015.

(51) Int. Cl.
*G09B 9/16* (2006.01)
*G03B 21/10* (2006.01)
(Continued)

(52) U.S. Cl.
CPC ............... *G09B 9/16* (2013.01); *G03B 21/10* (2013.01); *G03B 21/26* (2013.01); *G03B 21/28* (2013.01);
(Continued)

(58) Field of Classification Search
CPC ..... G03B 21/10; G03B 21/132; G06F 1/1645; G06F 1/3265; G09B 9/08; G09B 9/165
See application file for complete search history.

(56) References Cited

U.S. PATENT DOCUMENTS 4,976,536 A * 12/1990 Vogeley ............ G02F 1/133308
353/122
6,572,376 B1 * 6/2003 Saunders ................. G09B 9/08
244/194

(Continued)

*Primary Examiner* — Jerry-Daryl Fletcher
(74) *Attorney, Agent, or Firm* — Thomas J. McWilliams; Barnes & Thornburg LLP

(57) ABSTRACT

A heavy equipment cockpit training apparatus, device, system, and method is disclosed. The disclosed features include at least one substantially clear, substantially seamless pane to at least partially present an approximation of physical portions of the cockpit, at least one projector capable of backprojecting a simulation of the cockpit onto the at least one substantially seamless pane, at least one tactile aspect, discrete from the at least one seamless pane, interactively provided in association with the simulation, and at least one processor having communicatively associated therewith non-transitory computing code for at least partially providing the simulation and the interaction with the at least one tactile aspect.

21 Claims, 22 Drawing Sheets

(51) Int. Cl.
  *G03B 21/26* (2006.01)
  *G09G 3/00* (2006.01)
  *H04N 9/31* (2006.01)
  *G03B 21/28* (2006.01)
  *G03B 21/62* (2014.01)
  *G06F 3/01* (2006.01)
  *G06F 3/044* (2006.01)
  *G06F 3/14* (2006.01)
  *G06F 3/147* (2006.01)
  *G06T 11/60* (2006.01)

(52) U.S. Cl.
  CPC ............ *G03B 21/62* (2013.01); *G06F 3/016* (2013.01); *G06F 3/044* (2013.01); *G06F 3/147* (2013.01); *G06F 3/1423* (2013.01); *G06T 11/60* (2013.01); *G09G 3/002* (2013.01); *H04N 9/3147* (2013.01); *G06F 3/1446* (2013.01); *G09G 2300/026* (2013.01); *G09G 2354/00* (2013.01); *G09G 2370/16* (2013.01); *G09G 2380/12* (2013.01)

(56) References Cited

U.S. PATENT DOCUMENTS

| | | | |
|---|---|---|---|
| 2008/0206720 A1* | 8/2008 | Nelson | G09B 9/165 434/44 |
| 2008/0212038 A1* | 9/2008 | Hirata | G02B 17/08 353/70 |
| 2009/0091710 A1* | 4/2009 | Huebner | G03B 21/14 353/28 |
| 2009/0099836 A1* | 4/2009 | Jacobsen | G06F 17/289 704/3 |
| 2012/0076353 A1* | 3/2012 | Large | G03B 17/54 382/103 |
| 2012/0096373 A1* | 4/2012 | Aguera y Arcas | G06F 1/1645 715/764 |
| 2013/0069672 A1* | 3/2013 | Pedersen | G01R 27/26 324/679 |

* cited by examiner

APPARATUS, ENGINE, SYSTEM AND METHOD OF PROVIDING SIMULATION OF AND TRAINING FOR THE OPERATION OF HEAVY EQUIPMENT

CROSS-REFERENCE TO RELATED APPLICATIONS

This application claims priority to U.S. Provisional Patent Application No. 62/277,823, entitled "APPARATUS AND SYSTEMS FOR FLIGHT SIMULATION AND METHODS THEREOF", filed on Jan. 12, 2016, and to U.S. Provisional Patent Application No. 62/273,909, entitled "APPARATUS AND SYSTEMS FOR FLIGHT SIMULATION AND METHODS THEREOF", filed on Dec. 31, 2015, each of which are hereby incorporated by reference as if set forth herein in their entireties.

BACKGROUND

Field of the Description

The present invention relates to simulation and training, and, more particularly, to an apparatus, engine, system and method of providing simulation and training for the operation of heavy equipment, such as aircraft.

Description of the Background

Currently used industry standards, systems and devices for graphical simulation of heavy equipment, such as flight equipment, generally use multiple LCD monitors mounted end-to-end to display the entire width of the equipment cockpit. This traditional approach results in a segmented, discontinuous representation of the cockpit panels and equipment. Of course, in actuality, a cockpit display would not have large black seams, as are provided by multiple LCD panels in a grid. Further, a grid of LCD displays, even if those displays are touch screens, is not capable of providing an ergonomic or tactile experience that is a close approximation of the experience in an actual cockpit. For example, an actual cockpit might provide a curvature to aspects thereof that is unavailable based on the use of discreet flat panel displays.

Furthermore, LCD monitors quickly reach end-of-life, and when one fails, it may be impossible to replace it with a matching unit. Also, there are no known current training methods and systems that simulate heavy equipment in a home use context, or that provide for use with personal electronic devices.

In short, typical simulation systems are at remote, discrete, dedicated locations. Likewise, training materials, such as training manuals, are often held remotely and thus are not readily accessible to a user, such as for training or review. This limits the ability of heavy equipment operators, such as pilots, to be able to engage in refresher training, which, of course, may lead to less safe operation of such heavy equipment than would otherwise be possible.

Therefore, the need exists for an improved apparatus, system and method of providing simulation and training for the operation of heavy equipment, such as aircraft.

SUMMARY

The present disclosure provides at least an improved apparatus, system and method of providing simulation and training for the operation of heavy equipment, such as aircraft. Such a system may allow for the elimination of costly and burdensome equipment and the necessary maintenance that is generally associated with large scale simulators. The present invention may also act as testing tool that may allow users to complete certain compliance and licensure requirements in locations remote from the entire system, such as using handheld devices. The present invention may be easily deployed to third party locations, may work within existing technology infrastructures, may be deployed as a thin client and/or user-transparent client, and may further provide for cross-platform communication between systems and devices not otherwise communicatively compatible.

More particularly, the inventive embodiments may provide a projected simulation that allows for the training of a user to operate simulated heavy equipment, such as aircraft. The projected simulation may be projected by one or more projectors, under the control of at least one processor, onto at least one large, clear pane.

The projected simulation may provide teaching aspects, such as electronic user's manuals, engineering flows, or the like, overlaid onto the projection of the simulated cockpit of the heavy equipment. These teaching aspects may also include tactile features that simulate control enclosure, such as cockpit, equipment, such as buttons, switches, lights, and the like.

Tactile aspects may include wireless tactile aspects. These wireless aspects may be virtually provided, such as by motion sensing. These wireless tactile aspects may also be powered, and in such embodiments, the requisite power may be provided via optical power transfer, such as using energy collection from energy cells in receipt of the projected lumens comprising the simulated projection display.

Thereby, the exemplary embodiments provide an improved apparatus, system and method of providing simulation and training for the operation of heavy equipment, such as aircraft.

BRIEF DESCRIPTION OF THE DRAWINGS

The accompanying drawings are included to provide a further understanding of the disclosed embodiments. In the drawings.

DETAILED DESCRIPTION

Figure 1:
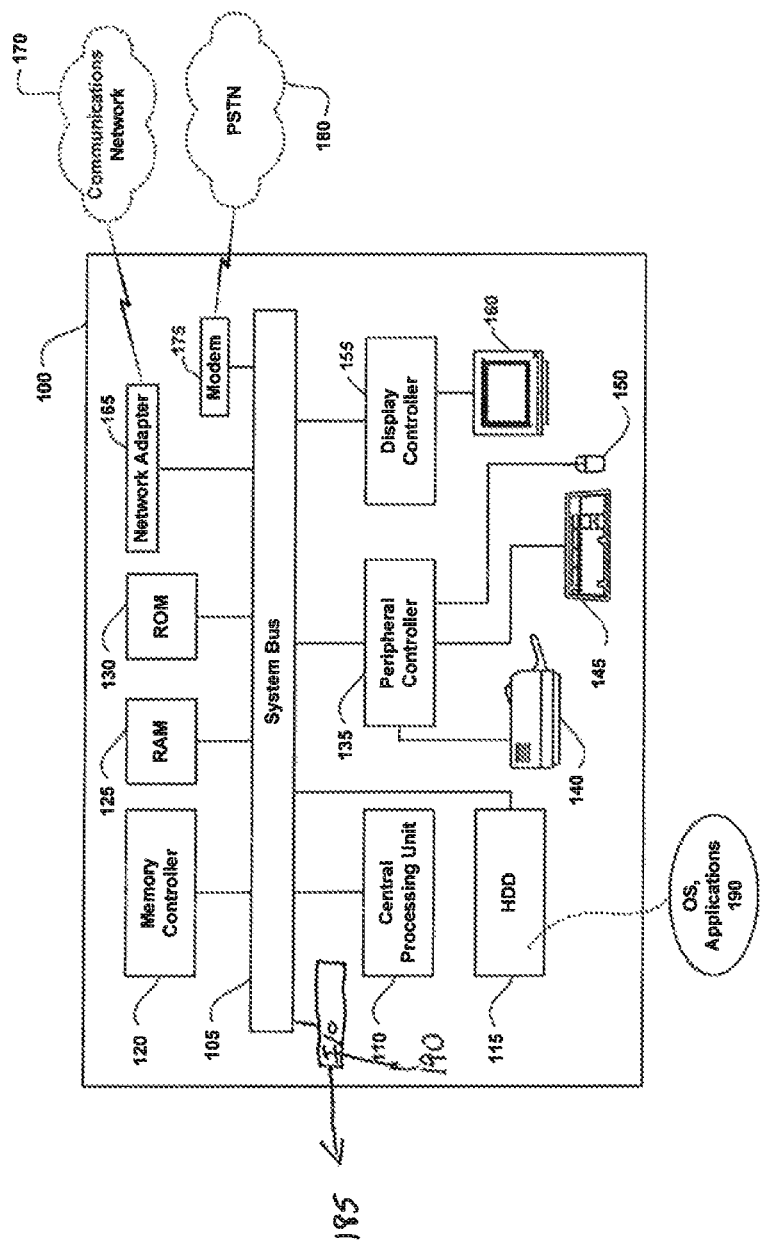
FIG. 1 is a block diagram of an exemplary computing system for use in accordance with herein described systems and methods.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to", "coupled to", or like term to another element or layer, it may be directly on, engaged, connected or coupled to the other element or layer, or intervening elements or layers may be present. In contrast, when an element is referred to as being "directly on," "directly engaged to", "directly connected to", "directly coupled to", or like term to another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be used only to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Further, electronic and computer-implemented platforms and methods of use are disclosed that provide automated and efficient processes and methodologies for providing heavy-equipment, such as air-flight, simulation, training and testing. The described computer-implementation aspects are intended to be exemplary in the illustrated implementation and not limiting. As such, it is contemplated that the herein described systems and methods can be adapted to provide many types of users of, and access and delivery of, many types of simulation and educational data, and can be extended to provide enhancements and/or additions to the exemplary services described. Reference will now be made in detail to various exemplary and illustrative embodiments of the present invention.

FIG. 1 depicts an exemplary computing system 100 that may be used in accordance with herein described system and methods. Computing system 100 is capable of executing software, such as an operating system (OS) and a variety of computing applications 190, and may likewise be suitable for operating hardware, such as one or more projectors connected via inputs/outputs (I/O), using said applications 190.

The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, mobile devices, and the like, CPU 110 is implemented in an integrated circuit called a processor.

The various illustrative logics, logical blocks, modules, and engines, described in connection with the embodiments disclosed herein may be implemented or performed with any of a general purpose CPU, a digital signal processor (DSP), an application specific integrated circuit (ASIC), a field programmable gate array (FPGA) or other programmable logic device, discrete gate or transistor logic, discrete hardware components, or any combination thereof, respectively acting as CPU 110 to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is appreciated that, although exemplary computing system 100 is shown to comprise a single CPU 110, such description is merely illustrative, as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium, such as HDD 115. Such instructions can be included in software, such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other communicative hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

The steps and/or actions described in connection with the aspects disclosed herein may be embodied directly in hardware, in a software module executed by a processor, or in a combination of the two, in communication with memory controller 120 in order to gain the requisite performance instructions. That is, the described software modules to perform the functions and provide the directions discussed herein throughout may reside in RAM memory, flash memory, ROM memory, EPROM memory, EEPROM memory, registers, a hard disk, a removable disk, a CD-ROM, or any other form of storage medium known in the art. Any one or more of these exemplary storage medium may be coupled to the processor 110, such that the processor can read information from, and write information to, that storage medium. In the alternative, the storage medium may be integral to the processor. Further, in some aspects, the processor and the storage medium may reside in an ASIC.

Additionally, in some aspects, the steps and/or actions may reside as one or any combination or set of instructions on an external machine readable medium and/or computer readable medium as may be integrated through I/O port(s) 185, such as a "flash" drive.

In addition, computing system 100 may contain peripheral controller 135 responsible for communicating instructions using a peripheral bus from CPU 110 to peripherals and other hardware, such as printer 140, keyboard 145, and mouse 150. An example of a peripheral bus is the Peripheral Component Interconnect (PCI) bus.

One or more hardware input/output (I/O) devices 185 may be in communication with hardware controller 190. This hardware communication and control may be implemented in a variety of ways and may include one or more computer buses and/or bridges and/or routers. The I/O devices controlled may include any type of port-based hardware (and may additionally comprise software, firmware, or the like), and can include network adapters and/or mass storage devices from which the computer system can send and receive data for the purposes disclosed herein. The computer system may be in communication with the Internet via the I/O devices 185 and/or via communications network 170.

Display 160, which is controlled by display controller 155, can be used to display visual output generated by computing system 100. Display controller 155 may also control, or otherwise be communicative with, the one or more projections or like simulation displays discussed herein throughout. Such visual output may include text, graphics, animated graphics, and/or video, for example. Display 160 may be implemented with a CRT-based video display, an LCD-based display, gas plasma-based display, touch-panel, or the like. Display controller 155 includes electronic components required to generate a video signal that is sent for display.

Further, computing system 100 may contain network adapter 165 which may be used to couple computing system 100 to an external communication network 170, which may include or provide access to the Internet, and hence which may provide or include tracking of and access to the domain data discussed herein. Communications network 170 may provide user access to computing system 100 with means of communicating and transferring software and information electronically, and may be coupled directly to computing system 100, or indirectly to computing system 100, such as via PSTN or cellular network 180. For example, users may communicate with computing system 100 using communication means such as email, direct data connection, virtual private network (VPN), Skype or other online video conferencing services, or the like. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate, and thus does not limit the implementation of the herein described systems and methods in computing environments having differing components and configurations. That is, the inventive concepts described herein may be implemented in various computing environments using various components and configurations.

As illustrated in the exemplary embodiments disclosed herein, a projected graphical instrument panel or panels for a training and simulation device may be provided. The disclosed exemplary embodiments stand in contrast to the current industry standards and typical devices for simulation of graphical heavy equipment, such as flight equipment. The known approaches use multiple LCD monitors mounted end-to-end to display the entire width of a control enclosure, such as a flight cockpit. This traditional approach may result in a segmented, discontinuous representation of the enclosure controls and panels. Furthermore, LCD monitors quickly reach end-of-life and when one fails, it may be impossible to replace it with a matching unit.

The disclosed exemplary embodiments may provide a graphical instrumentation panel for heavy equipment training, such as for large vehicle training, such as for flight training, which may be back projected or otherwise projected onto one or more substantially seamless and/or substantially continuous glass, acrylic, or like, panes. Moreover, this display may be a projected touch screen. By way of non-limiting example, images may be generated by one or multiple projectors, such as together with various optical equipment, such as beam folding mirrors, reflective or refractive elements, lenses, lasers, fiber optics, or the like. Further, optical, infrared (IR) and/or near-IR monitoring equipment may be associated with the projection equipment.

The size and shape of a training device and system in accordance with the disclosure may be scalable in size and/or shape, such as by modification to sizes and/or shapes of the pane or panes in use, by adding or removing projectors, or the like. As referenced, in various additional and alternative embodiments, panes or aspects of panes may be touch sensitive to allow the user to interact with the graphical panel, such as through the use of capacitive or other touch sensitive surfaces, light beam, IR or near-IR sensing, buttons, or the like, and wherein the referenced touch sensitivity may be provided via wire or wirelessly. Accordingly, the present invention may provide for a seamless, uninterrupted workspace, and may allow for and provide a self-paced instruction and familiarization, for example.

Thus, the disclosed embodiments may provide a seamless control enclosure, such as a cockpit, experience, including the capability to provide hardware aspects for inclusion in association with a touch screen. In short, known touch screens do not provide the ability to cut holes therein without affecting the capacitive properties that allow for the operation of the screen as a touch screen. In contrast, alternative ones of the disclosed embodiments allow for the cutting of a hole and the dropping in through the hole a various hardware as a seamless inclusion with the touch screen aspects, due, in part, to the non-capacitive nature of the exemplary IR or near-IR "touch" screen. Moreover, the touch screen experience may allow for a simplification of the providing of instruments in a specific aircraft. For example, in typical known simulation embodiments, equipment must be obtained that is identical to the aircraft, and the wiring and actuation of that equipment must be varied to allow for the equipment to interact with the simulation; or, in other known embodiments, equipment suitable for interaction with the simulation is designed specifically for inclusion in the simulation, although the equipment must be designed to have outward-facing hardware that is identical to that found on the actual aircraft. On the contrary, the disclosed embodiments may allow for the presentation on the touch screen of equipment that is visually identical to that in the actual cockpit, but, which allows for that equipment to readily interact with the software of the simulation, at least in part because that equipment is provided as part of that same software of the simulation.

More particularly and by way of example, the touch screen aspects of the disclosed embodiments may be provided using near-IR fields to sense the location on the projection pane at which the user has touched. Moreover, user movements may be tracked in relation to the projection pane(s), such as the turning of a knob, the actuation of a lever, or the like. This may occur because the simulation on the seamless screen has, of record within the simulation software, specific x, y coordinates for every aspect of the simulation on the screen. Thereby, when a user "touches" the projection pane or "actuates" a projected control element, the x, y coordinates of what aspect of the simulation is at that point on the pane may be assessed, and the simulation software may thus react to the touch or movement accordingly. This may occur, for example, using the projection methodologies discussed hereinthroughout to project the simulation onto the pane, and using one or more near-infrared cameras directed at the screen, such as from the rear portion thereof. It will be noted by the skilled artisan that the foregoing may occur for any pane(s) provided in a simulation, including overhead cockpit aspects that are "above" the cockpit window experience, and/or center console aspects.

Thereby, the disclosed embodiments may provide interactive system environments, such as for use in teaching and training, which may further include a network architecture. The disclosed seamless, continuous projected graphical display allows for many forms of training material to be fully integrated with the simulated control enclosure, such as a cockpit, locally or remotely. Examples include electronic flight manuals, interactive training material, dynamic flow charts and instructional videos. This material may be overlaid on top of the graphical cockpit and moved (such as by tactile "dragging") where and when needed, and may be locally and expediently available on an as-needed or desired basis, instead of being remote and not easily accessible to the user as in the known art, such as in the case of a hard copy training manual, for example.

Thus, training may occur in heretofore unknown environments. For example, a learner and an instructor may be separated, even at different geographic locations, and instruction may nevertheless occur based on the communication capabilities of the disclosed embodiments. Thereby, an instructor may provide a lesson, such as wherein the user is shown what to do, and thereafter the user may be asked to attempt to do it with the help of the instructor, and finally the user may "fly solo" while watched by the instructor. In such circumstances, the instructor may also have a control capability, wherein the instructor may remotely modify the circumstances of any simulation as it is ongoing, and those modified circumstances may be presented to the user in real time.

In such embodiments, the simulation system, or modules thereof, may provide network connectivity, as discussed above with respect to FIG. 1. This network connectivity may allow for bi-directional streaming of data, such as including audio and video, in order that training may be provided and assessed. That is, both a learner's use data and operations within the use environment may be streamed and viewed by, for example, a remote instructor. Of course, given such capabilities, combination training programs may be made available, such as whereby a user does a certain amount of remote training, and a certain amount of on-site training, such as in order to obtain necessary certifications.

Thus, in accordance with the embodiments, the simulation may serve as a true simulation, or may serve as a computing display with a touch screen, onto which training aspects can be additionally provided. That is, the screen may operate as a training canvas, such as may receive training information for maintenance, testing, convertible heavy equipment, types of instruction, or the like.

The present invention may also provide for the use of gesture recognition technology, such as for summoning and dismissing training material to and from a pilot interactive training canvas. In such embodiments, the user may use simple and common hand gestures to manipulate the material presented on a training canvas, such as the disclosed seamless display panel.

Accordingly, and as discussed herein throughout, the use of cameras in the embodiments, such as including the use of visual and/or IR or near-IR sensing, may additionally be used in order to assess user movements and gestures including those that do not touch a touch screen. Accordingly, and by way of non-limiting example, a user experiencing a simulation having an upper touch pane(s) and a main touch screen console may stop a simulation in order to waive her hand to "pull" the top touch console down to the main console in order that the user may receive training regarding the top console without the inconvenience of having to constantly lift her hand up to reach the upper console and look upward in order to receive said training.

Moreover, the foregoing features, or combinations thereof, may be used to provide gaming and entertainment embodiments, such as including gesture-recognition. For example, various movie "cockpits" could be readily provided using the disclosed touch pane simulation, such as the Millennium Falcon from Star Wars, the cockpit from the movie Airplane, or the like. In part because the disclosed simulations include a blended image, such as of multiple projectors, as well as a cockpit window and variable aircraft console types, along with gesture-recognition in alternative embodiments, all mated together within the simulation software, the ability to vary the user's cockpit experience, such as for gaming or entertainment, is readily available through the use of the disclosed embodiments.

Yet further, in gaming, entertainment, or true simulation embodiments, the communicative capabilities and simulation variability provided by the disclosed embodiments may allow for the use of the disclosed embodiments with, for example, home television set acting as, for example, the cockpit window. That is, the inclusion of wireless communication methodologies in the disclosed embodiments may allow for wireless or wired communication between the simulated cockpit console projection and, for example, any display screen available to the user via wireless or wired means. Moreover, the use of separate hardware for inclusion in a given simulation yet further decreases the energy footprint of the disclosed embodiments. By way of nonlimiting example, the use of low-energy footprint elements in disclosed embodiments that include a simulated cockpit window may allow for the operation of the entirety of a disclosed system to draw less than 8 amps of current.

Figure 2:
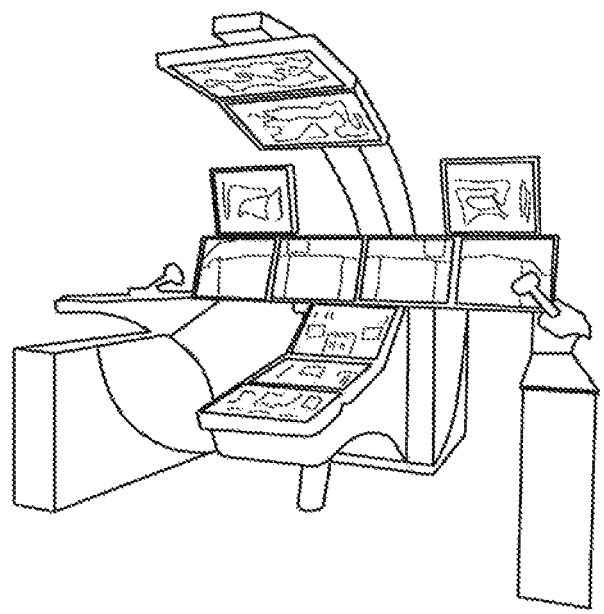
FIG. 2 illustrates illustrative aspects in the known art.

FIG. 2 illustrates a particular exemplary embodiment. Illustrated in FIG. 2 is a typical flight training system in which multiple display panels, each having seams therebetween, are provided, and wherein each display panel provides one or more aspects to simulate an airplane cockpit. Of note with regard to FIG. 2, a typical commercial cockpit would not have the large black seams illustrated between each of the panels, and further would not necessarily provide the tactile experience provided by the training device of FIG. 2. For example, an airplane cockpit might provide a curvature to aspects thereof that is otherwise unavailable based on the use of discreet flat panel displays in the illustration of FIG. 2.

Figure 3:
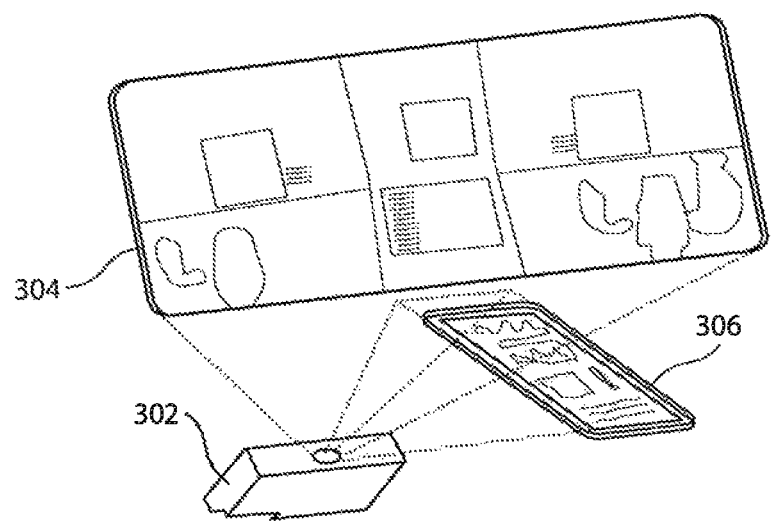
FIG. 3 illustrates exemplary embodiment of the present invention.

FIG. 3 illustrates an exemplary embodiment of the instant invention in the form of a graphical cockpit simulation/training device and system having graphical "panels" projected onto one or more seamless glass or acrylic panes. Although FIG. 3 and numerous of the figures throughout may present an exemplary embodiment in the form of a cockpit, the skilled artisan will appreciate, in light of the discussion herein, that any enclosure or partial enclosure, such as any heavy equipment control center, may be provided as a simulation or training exercise.

In the illustration of FIG. 3, and by way of non-limiting example, two projection panes, rather than the individual display screens in the known art, are illustrated. In the illustration, the equipment projected by projector 302 onto panes 304 and 306 is substantially as the cockpit would appear in an actual airplane for which simulation/training is underway. That is, the panes may be provided, shaped and spaced in such a manner that the tactile and spatial experience provided by the exemplary embodiments is substantially that which would be provided by the actual cockpit of the airplane that is then the subject of simulation/training. As shown, seams between aspects of the cockpit are preferably not provided where no seams would be provided in the actual cockpit.

Although two panes are illustrated in the exemplary embodiment of FIG. 3, the skilled artisan will appreciate, based on the disclosure herein, that multiple panes could be seamlessly provided, such as based on the fact that each pane is clear or substantially clear in composition, and similarly a single pane might be provided that is sized, shaped and spaced so as to substantially precisely replicate a desired cockpit orientation. By way of non-limiting example, an exemplary pane may be of approximate dimensions 48 inches wide by 18 inches tall.

The panes may be clear, substantially clear, or partially clear, such as to allow for backprojection as illustrated in the exemplary embodiments. As such, the panes may be formed of glass or acrylic. More particularly, the panes may be composed of cast acrylic sheet, such as the PLEXIGLAS brand of pane made by Arkema, by way of non-limiting example.

Figure 4A:
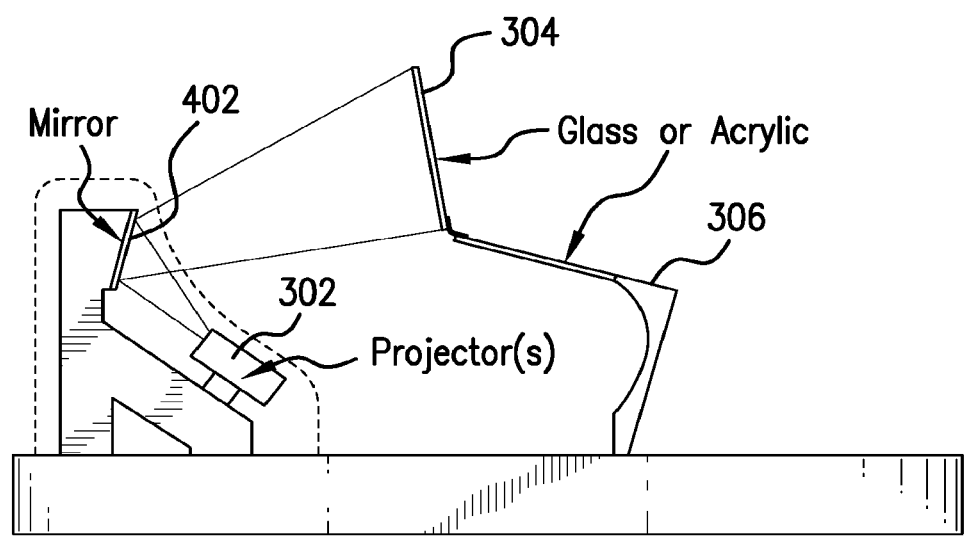
FIGS. 4A-C illustrate exemplary embodiments of the present invention.

FIG. 4A is a more extensive illustration of the cockpit exemplary embodiment provided in accordance with the basic example illustrated in FIG. 3. In FIG. 4A, a side view illustration of a projected cockpit is shown. In the illustration of FIG. 4A, projector 302 projects one or more images onto beam folding mirror or mirrors 402, which are exemplary of optical elements 402 that may be used to form and/or modify the projection provided by the one or more projectors 302. Thereafter, the projected cockpit is backprojected onto at least pane 304, such as to replicate the cockpit of an airplane or the instrument panel of other heavy machinery.

Figure 4B:
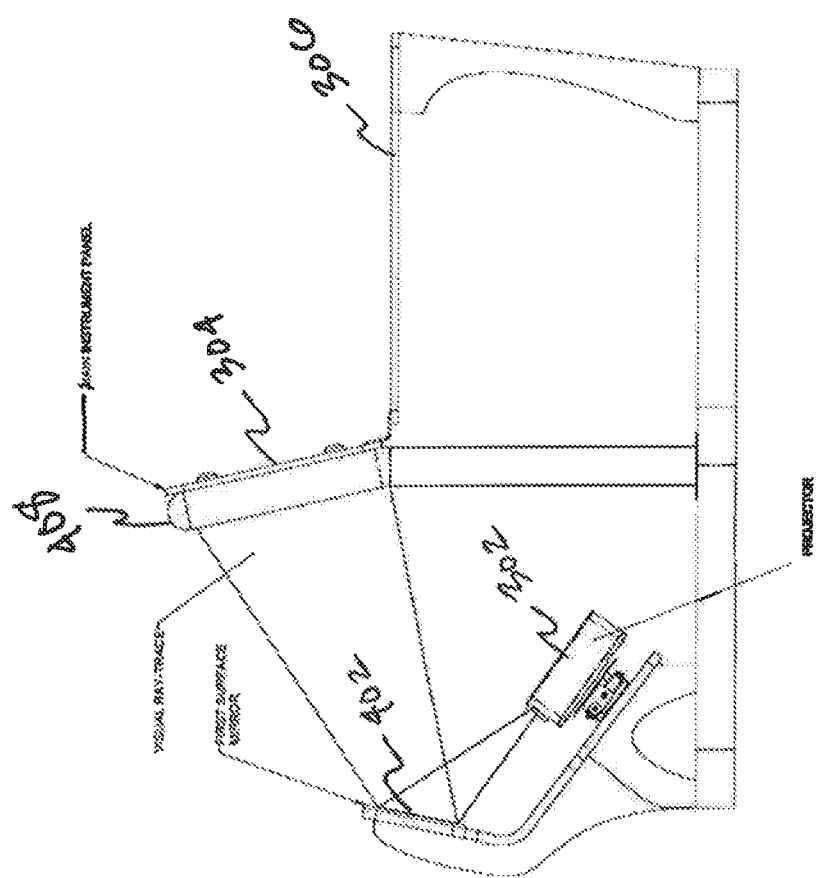

FIG. 4B is a further illustration of the exemplary embodiment of FIG. 4A. In the illustration of FIG. 4B, the pane that provides the main instrument panel 304 may be additionally supported by support 408. In some embodiments, support(s) 408 may be optically irrelevant to the projection of the simulation onto pane 304. However, in additional embodiments, support 408 may be an active optical element, such as optical elements 402. That is, support 408 may redirect the beam, focus aspects of the projection, and/or provide a tactile receiver, for example. In the illustration of FIG. 4B, and in the additional exemplary embodiments described herein, projector 302 may be, for example, an LED high definition projector, and may be one of multiple projectors provided to enable the disclosed embodiments. Of course, any projector may be serviceable for use in the disclosed embodiments. More specifically, an LED projector operable with the exemplary embodiments may be the Vivitek Qumi, although the disclosure is by no means limited to this or similar devices.

Moreover, optical elements 402 such as those shown in the example of FIG. 4B are illustrative only, and the skilled artisan will appreciate, based on the disclosure herein, that other or additional similar or dissimilar optical elements may be desired and/or required to implement the disclosed embodiments. By way of non-limiting example, optical elements used in the instant disclosure may include a first surface mirror having dimensions 10 inches wide by 35 inches wide.

Figure 4C:
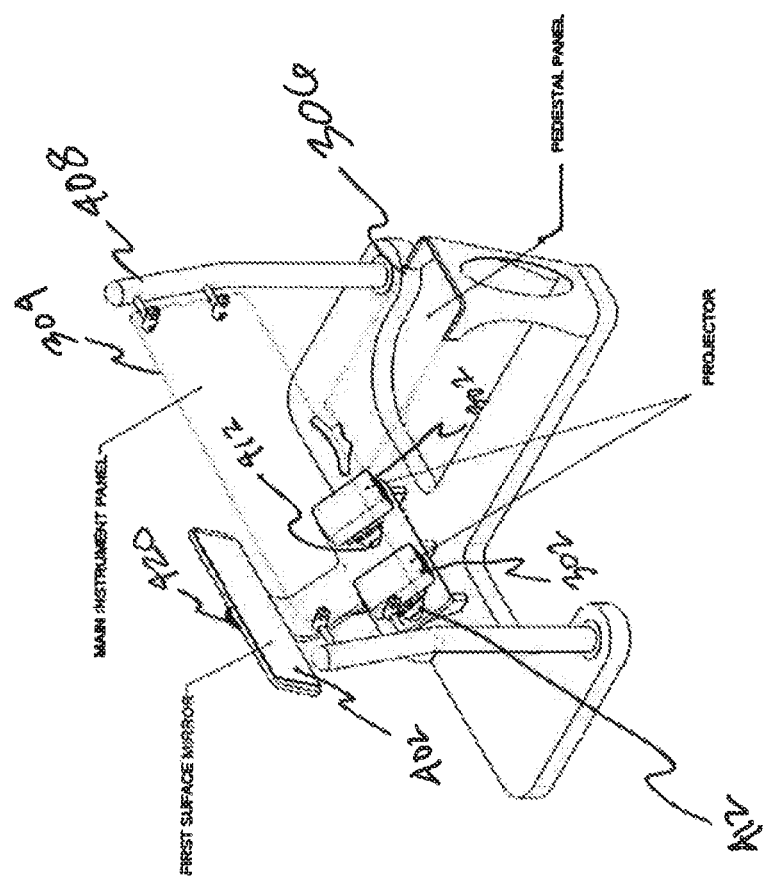

FIG. 4C provides an additional illustration of an exemplary embodiment of the disclosed systems. In the illustration of FIG. 4C, multiple projectors 302 are provided. Moreover, these multiple projectors may be provided with adjustments 412, such as to allow for modification of the direction and/or focus of the projection from projector 302, as discussed further hereinbelow. Moreover, optical element 402 may be physically associated with adjustment 420, which may allow for adjustment of optical element 402 along 2 or more axes of rotation, to allow for improved projection or focus onto pane 304. Such an optical element may be, for example, Peerless AV PRGS-UNV Projector Mount. Additionally as shown in FIG. 4C, supports 408 may allow, by way of non-limiting example, for the provision of power to pane 304 or pane 306, such as to allow for actuation of one or more capacitive touch elements or like tactile elements, or powering of wireless transceivers, for example.

The adjustments 412 for multiple projectors of FIG. 4C may additionally be provided in software, firmware, or combinations thereof in conjunction with hardware. For example, from an optics perspective, to the extent a disclosed exemplary embodiment employs multiple projectors, the projections provided thereby are exceedingly unlikely to fully or even substantially "line up," even with significant mechanical adjustment. Therefore, the projections provided in the embodiments may be subjected to image monitoring, such as within the control software that provides the simulation onto the controls panel(s), and feedback to allow for a pixel to pixel lining up of the various projections from the multiple projectors. This pixel for pixel line up may vary based on processing needs, such as wherein a simplistic lining up causes the overlapping and/or blending of the multiple projections along the outer portions thereof to allow for a seamless user experience, but, where more processing power is acceptable or available, the pixel for pixel lining up may be precise to more optimally align the edges of the projections from each projector. All such adjustments, including these algorithmic software adjustments, fall within the definition of adjustments 412 as envisioned herein.

Figure 5A:
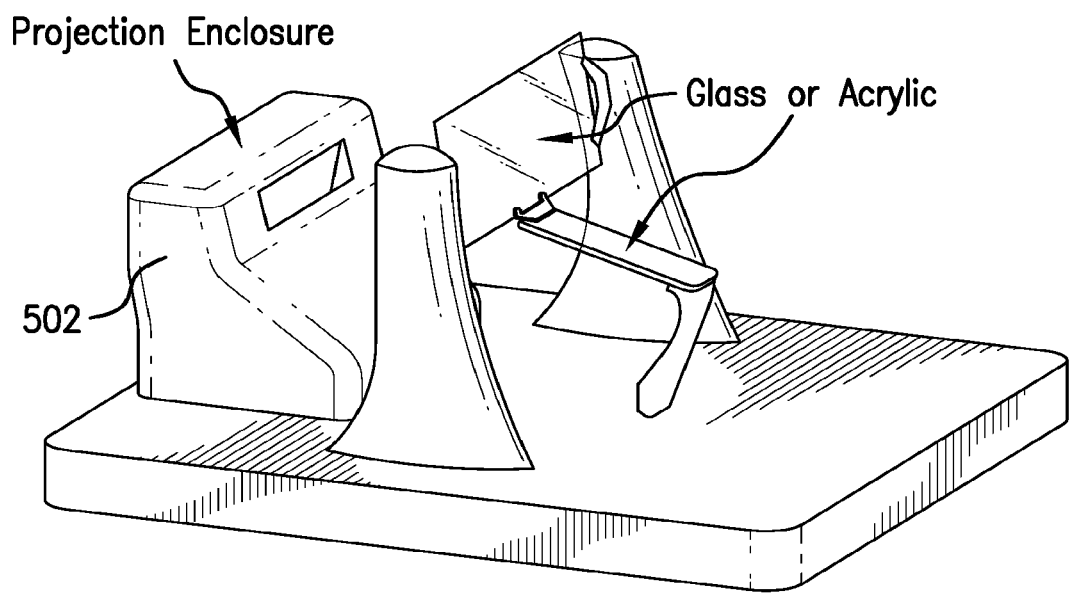
FIGS. 5A-B illustrate exemplary embodiments of the present invention.

FIG. 5A is an additional illustration of the disclosed exemplary embodiments. In the illustration, the projection system is encased within enclosure 502. Enclosure 502 may allow for one or more projection paths/image traces to emerge therefrom, and may provide protection of the enclosed equipment from, for example, damage, dust, unauthorized modification, degradation in optical performance due to any of the foregoing, or the like. Enclosure 502 may be formed of a plastic, or like substance, sized and shaped by, for example, injection molding. For example, an exemplary enclosure 502 may be composed specifically of KYDEX Thermoplastics.

Figure 5B:
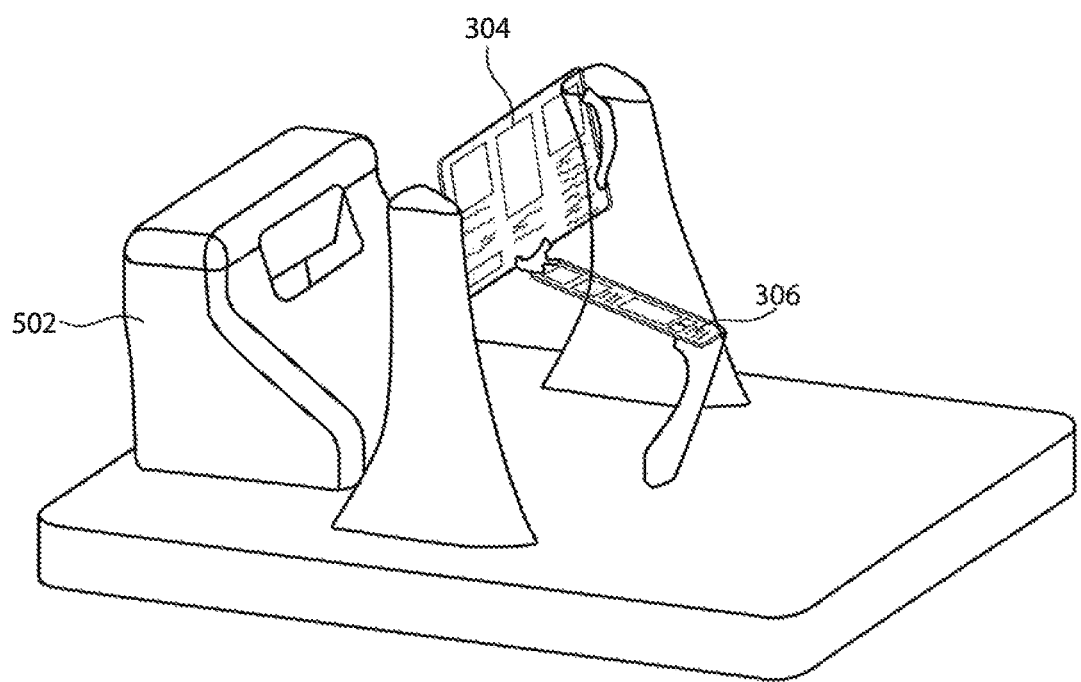

FIG. 5B illustrates the seamless graphical projection of a main instrument and center console panels for an airplane onto multiple panes 304 and 306 from within enclosure 502. In the illustration of FIG. 5B, projection enclosure 502 may have at least two exit points that may each discretely allow for the projection of simulated instrumentation onto one of pane 304 or 306. Alternatively, projection enclosure 502 may have one exit path, and optics associated with panes 304 or 306, or related to the angle of panes 304 or 306, may allow for the single image exit from projection enclosure 502 to project the instruments onto both panes 304 and 306, such as using the adjustments 412 discussed above.

Figure 6:
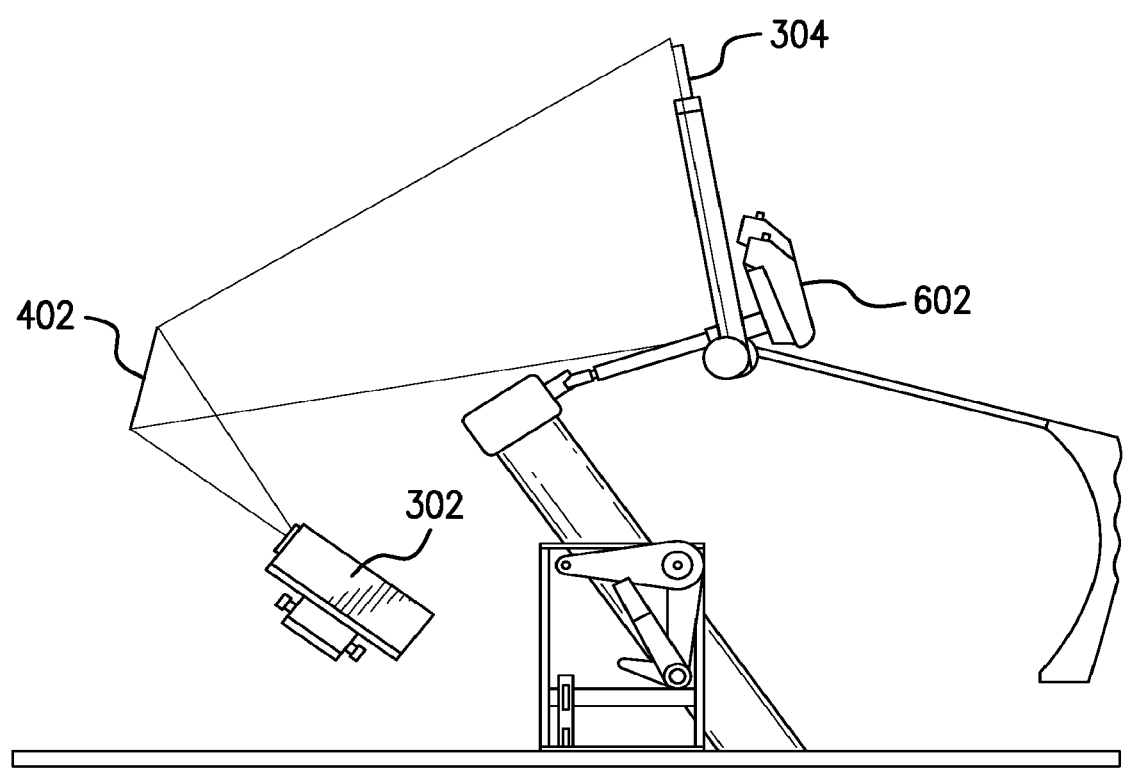
FIG. 6 illustrates an exemplary embodiment of the present invention.

FIG. 6 is a particular illustration of the optics system for projecting onto pane 304. For example, between 2 and 7 LCD monitors in the known art may be replaced by the optical system formed at least by projector 302, optical element 402, and pane(s) 304 in the illustration of FIG. 6. Accordingly, the optical system of FIG. 6 may provide a seamless, uninterrupted work space to improve training or simulation options.

Also illustrated in FIG. 6 are secondary hardware elements that may be associated with the simulation/training device and system disclosed herein. More particularly, FIG. 6 includes an illustration of cockpit steering column/yoke 602 physically associated with pane 304. Specifically in the illustration, yoke 602 may move in a manner that replicates the steering column in the actual aircraft then under training, and may be ergonomically positioned so as to be similarly proximate to and having substantially similar spatial relationship with the cockpit elements projected onto pane 304.

Further, and specifically in relation to the exemplary embodiment of FIG. 6, various ones of the secondary, or actual<hardware elements (i.e., exemplary yoke 602 in FIG. 6) may thus be provided in conjunction with the simulations discussed herein. For example, one or more center consoles having variable hardware associated therewith may be interchangeable for placement into the center console. That is, the "type of aircraft" may vary based on the hardware and projected touch screen that are placed into physical association with the center console. In short, the projection of any touch screen aspects of the center console, as well as, optionally, the projected physical features of the main console, may be changed by the simulation to simulate a different type of aircraft when the hardware switches of the center console are switched out. This modification to the aircraft simulation type may occur manually at the direction of the user, or automatically as discussed above, such as upon replacement of a center console. In short, the disclosed software engine may vary any simulation based on detected hardware.

Thereby, hardware features, such as levers, buttons, or hardware switches, may be associated with, for example, the center console. Likewise, other hardware features may be associated with the seamless main console, such as just below the cockpit window. In such embodiments, hardware may be switched in or out, such as through holes in the console, and/or may be interconnected to the top portion or bottom portion of the main console, such as through the use of simple clips or tabs on the hardware that may be removably attached to the main pane/console or the center console. Moreover, such hardware may communicate using any one or more of the discussed communications methodologies herein, such as by including physically therewithin one or more wireless communication methodologies, such as a WiFi, Bluetooth, RF, IR, near-IR, or cellular communications.

As such, the communications included in the hardware may "piggy-back" on the connectivity of the overall system, such as wherein the secondary hardware communicates using infrared or near-infrared and accordingly communicates with the IR or near-IR cameras that are also assessing the user's touch to the one or more touch screens included in the embodiments. That is, the disclosed embodiments may include the sending of data over the same IR or near-IR channels over which touches to the touch screen are assessed.

Yet further, such "clip-on" or removable hardware may be powered by any known methodology, such as by one or more batteries, such as rechargeable batteries. Therefore, the power provided to secondary hardware may be on-board hardware itself, may stem from a simple wall socket, and/or may be provided by the energy collection methodologies discussed hereinthroughout. In a preferred embodiment, the power drawn by the clip-on hardware may be minimal, such as due to the use of ultra-low power chip sets in order to convey use data from the hardware.

More particularly, an IrDA chip may be included in a clip-on hardware wireless "box" in order to stream data to the near-IR camera set that is tracking user movements. In such embodiments, the IR data is streamed to a data receiver, such as the IR camera, in a manner similar to that in which IR data from a TV remote would be conveyed to a TV, as will be apparent to the skilled artisan.

Various other types of hardware may be associated with, and transmit or receive "piggy-backed data" to or from, the overall simulation system. By way of non-limiting example, further provided in the disclosed embodiments may be various novel monitoring and/or feedback systems. For example, haptic feedback may be provided, such as wherein piezo-electric elements are associated with and/or embedded in, for example, a main console pane or center console pane, and such as wherein positive or negative reinforcement in provided using such haptic feedback. Similarly, feedback may be provided, such as via tactile or audible feedback, with the disclosed swappable physical instruments/secondary hardware, the visual projection, and/or touch instrument panels, or the like. Such feedback information may be transmitted from the system's communications, such as via wireless transmission using IR, near-IR, or Bluetooth, by way of non-limiting example, and may thus be responsive to data representative of received user action information.

Figure 7:
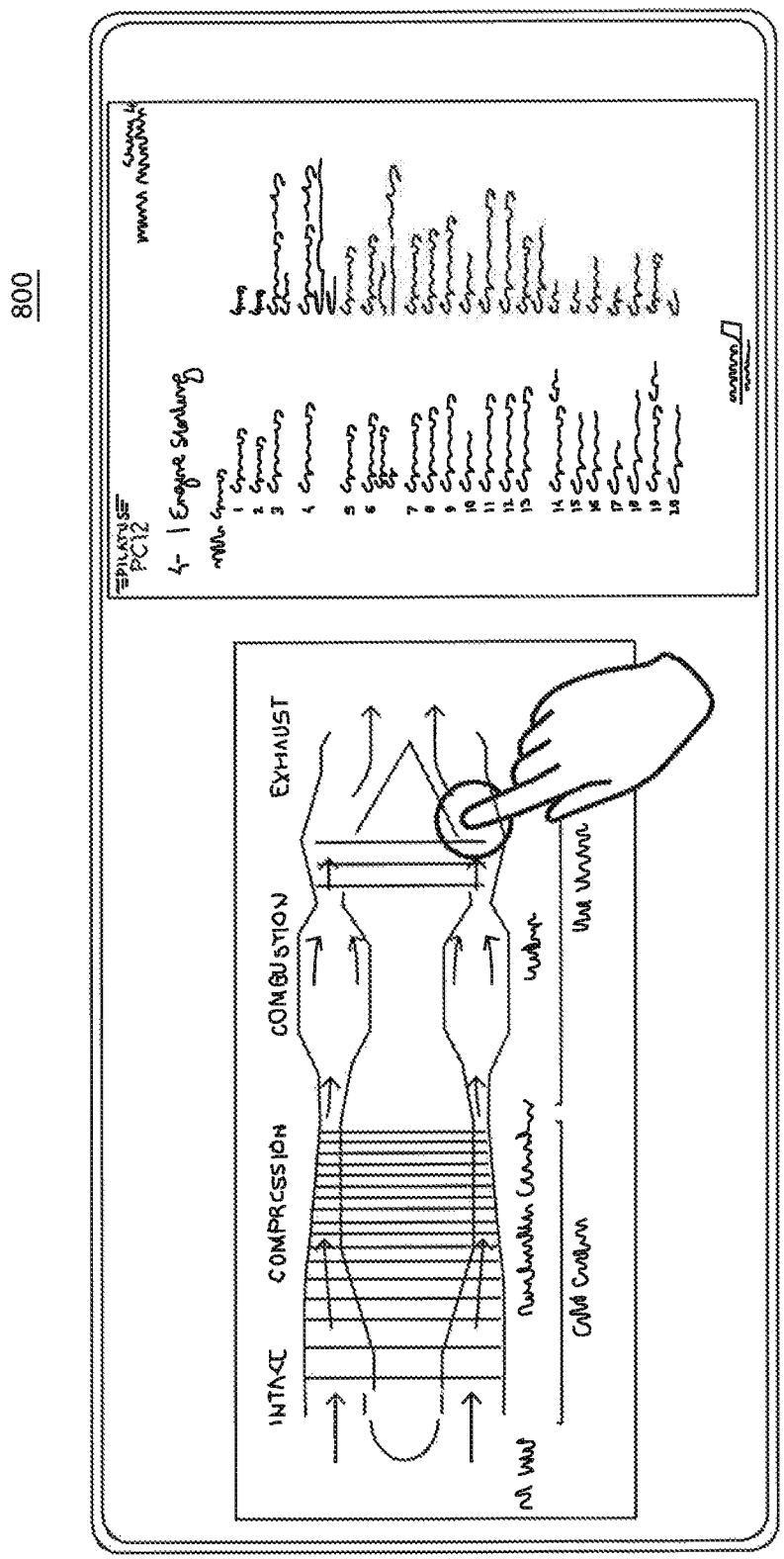
FIG. 7 illustrates an exemplary embodiment of the present invention.
Figure 8:
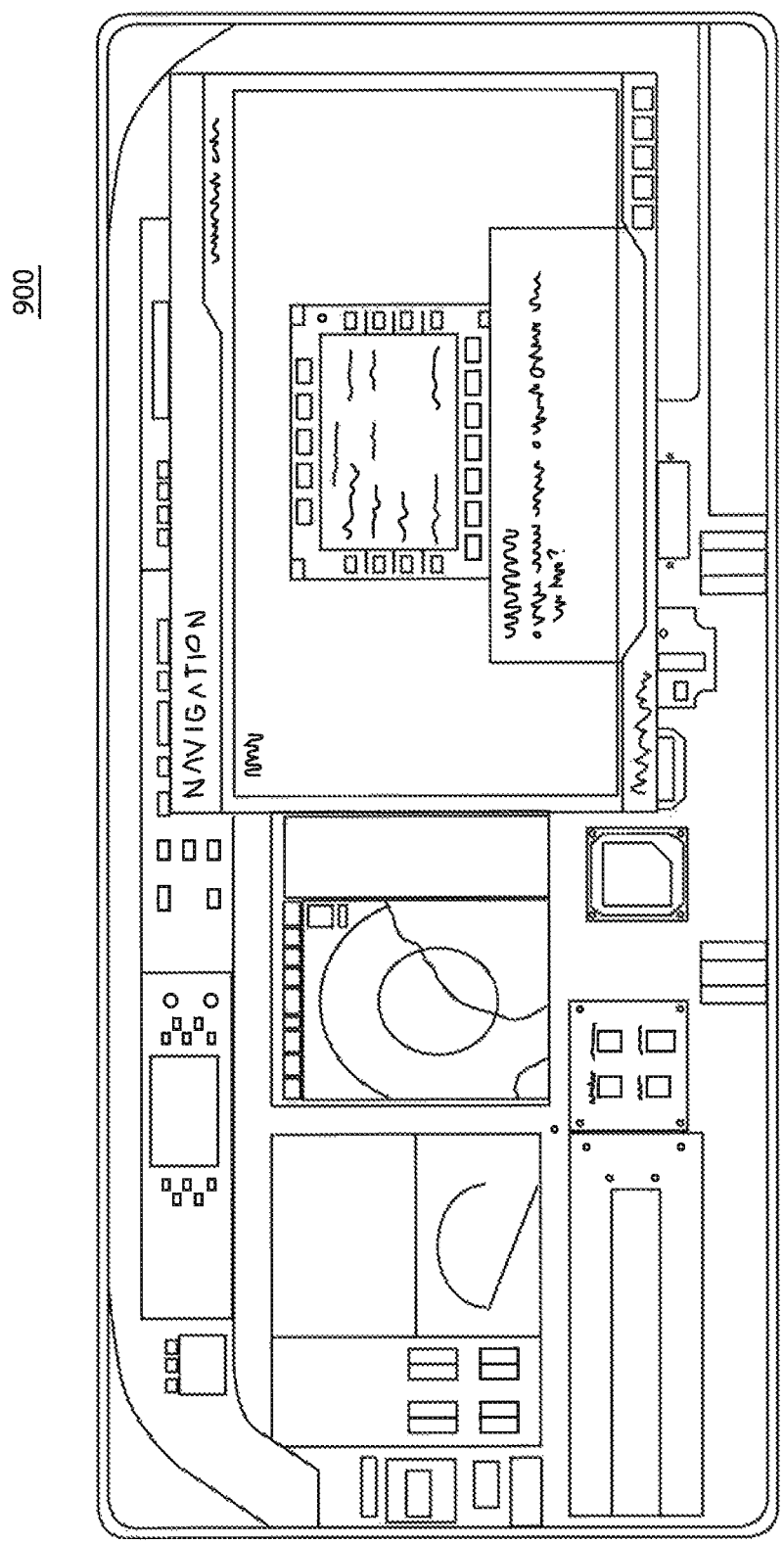
FIG. 8 illustrates an exemplary embodiment of the present invention.

With reference to the specific embodiment of FIG. 8, a particular training exercise is illustrated. Those skilled in the art will appreciate, in light of the discussion herein, that the example provided in FIG. 7 is exemplary in nature only, and is not limiting as to the nature of available training methodologies employing the disclosed embodiments. In the illustration 800, a user is provided with training on normal procedures for engine starting. In the illustration, the engine starting procedures are overlaid on the interactive panel described herein. That is, visible under the teaching particulars at each step of training are the projected aspects of an airplane cockpit with respect to the training that is occurring.

As shown, the user may be trained not only with regard to the cockpit elements and indicators used at a particular operational step with respect to which training is then-occurring, but additionally the user may be provided with an indication of what occurs when the user actuates particular elements of the cockpit, such as from an engineering standpoint, such as in order to enhance the user's overall understanding of the equipment on which she is being trained. That is, as illustrated in FIG. 7, the user may be provided with a touch interface that is displayed to the user as if in-cockpit, wherein, as the user actuates particular equipment within the displayed cockpit in accordance with the procedures being taught, the user may also be provided with an engineering illustration of what happens to aspects of the airplane when the cockpit equipment is actuated. In short, all of the foregoing may form part of the software that controls the simulation and the communications.

In the particular example of FIG. 7, the operation of a jet engine during the starting process is displayed, and, as shown, the user may interact with the illustration by touching particular aspects of the illustration. By way of non-limiting example, the user may call up the engineering illustration manually, such as by touching a menu option or the displayed steps in a display training manual, or the user may automatically be provided with an engineering illustration as the user steps through the training and/or actuates the displayed cockpit equipment.

Moreover, in the disclosed embodiments training/learning and simulation environments may be combined. For example, a user in an active simulation may halt the simulation in the disclosed embodiments in order to look up information for training purposes, in part because the provided projections may make available any visual indications that the software has available to provide. This is, needless to say, unknown in the current state of the art. In short, the instant simulation may not simply provide a "dumb" simulation, but rather may provide a simulation having great levels of variability, such as wherein the simulation may switch back and forth to training or remote testing using the disclosed systems and methods.

In a manner similar to FIG. 7, FIG. 8 also illustrates a particular exemplary embodiment of a training exercise occurring with respect to a displayed cockpit on the disclosed novel instrument pane(s). As shown in the illustration 900, aspects of training related to navigation of the subject aircraft have been provided to a user, and aspects of the user's knowledge responsive to the training may be tested, such as following each step of the training, following particular steps of the training, following units of the training, following categorical areas of the training, following training with respect to particular types of equipment, and/or the like. As shown, the user in FIG. 8 has been provided with a question in relation to a particular aspect of navigation training that has recently occurred. Of further note with regard to illustration 900, it may be that the navigation training has recently occurred via a cockpit displayed on the novel panel/pane(s) disclosed herein, as is evident from the example of FIG. 8.

The present invention may provide wireless tactile panels for flight training devices and systems to be associated with the disclosed projections, as discussed throughout. In the known art, tactile aircraft panels, which contain physical knobs, buttons, and the like, are often added to graphical flight training devices and systems. Such previously known tactile panels may typically be placed on top of or beside an LCD monitor, for example, and generally require wires for power and to transmit electronic data. Adding such panels to the disclosed seamless projection training canvas may require unsightly wires routed through or around the glass or acrylic. Thus, in exemplary embodiments, a wireless tactile panel may be used with the disclosed embodiments of a projection training canvas, such as using the improved IP or near-IR camera-based monitoring techniques discussed herein for data transmission.

Of course, variable monitoring and data reception technologies beyond the IR or near-IR capabilities discussed herein may be provided in alternative embodiments. For example, visual recognition, such as optical color or character recognition, may be used to monitor user activities. For example, mechanical switches and knobs extending through holes in a touch panel may have, on the backs thereof, color or letter wheels (in addition to, or alternatively to, IR or near-IR communication units), and accordingly one or more cameras associated with the embodiments may monitor the wheel for rotation of the physical elements, in addition to monitoring, such as the IR or near-IR monitoring, of the touch panel. As will be appreciated by the skilled artisan, such monitoring may be performed by one or more cameras of a single type, such as a dual near-IR and visual spectrum camera, or may be performed by sets of cameras of varying types.

Moreover, in order to optimize energy efficiency and/or minimize energy consumption, wireless tactile panel embodiments may use an array of solar cells to siphon power from the projections, and/or may transmit and/or receive electronic data using IR, Bluetooth, and/or WiFi technology, for example, as referenced herein. More specifically, and as discussed below with reference to FIGS. 9-11, the present invention may make use of optical power transfer and optical data transfer to achieve wireless and/or energy efficient operation of various control panes/panels and/or aspects of panes/panels, and/or additionally to achieve charging of on-panel energy storage components. Correspondingly, processing and interconnecting components on panels may be ultra-low power components so as to minimize power consumption. Energy and data transfer may occur as direct line of sight, or through various media such as glass, plex, or lexan, by way of non-limiting example.

Figure 9:
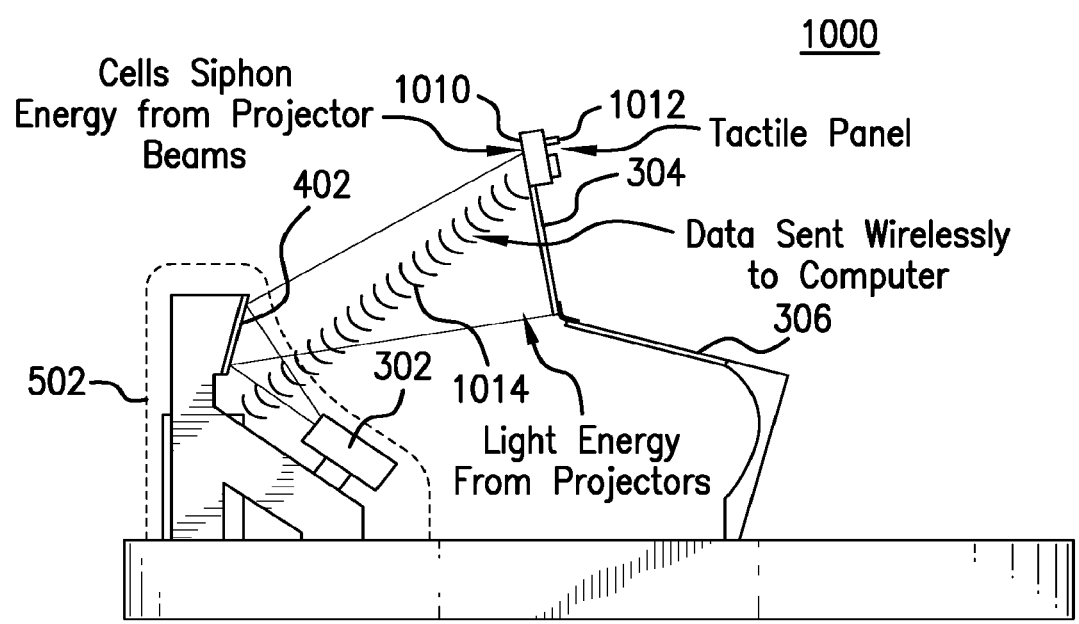
FIG. 9 illustrates an exemplary embodiment of the present invention.

More specifically, FIG. 9 illustrates an exemplary embodiment of a wireless tactile panel, such as may be used with heavy equipment or flight training devices. In the exemplary embodiment of FIG. 9, optical panels 304 and 306 are again provided, and light is received from redirecting optical element 402 as projected onto optical element 402 by projector 302. However, in this additional exemplary embodiment, the light energy received from projector or projectors 302 strikes receiving energy cells 1010, which receive energy from the projector beams and translate the received energy into electrical power. Further in this illustration, elements that necessitate power 1012 to function may receive the power generated from the energy received at solar cells 1010. Such elements 1012 may include, for example, tactile elements, such as physical knobs, buttons, lights, or the like, which may be mounted to or through the glass or acrylic of panels 304 and 306. Similarly, various integrated touch elements (including capacitive sensing, for example) of panels 304 and 306 may receive power, such as from power traces through the panels, as generated by energy cells 1010. In the wireless embodiment of FIG. 9, data received by the tactile elements of the panels may also use the energy provided from cells 1010 to send the data wirelessly back to a computer integrated within housing 502, or to another local network location. This local sending may occur wirelessly via Bluetooth, WiFi, infrared, or the like.

Figure 10:
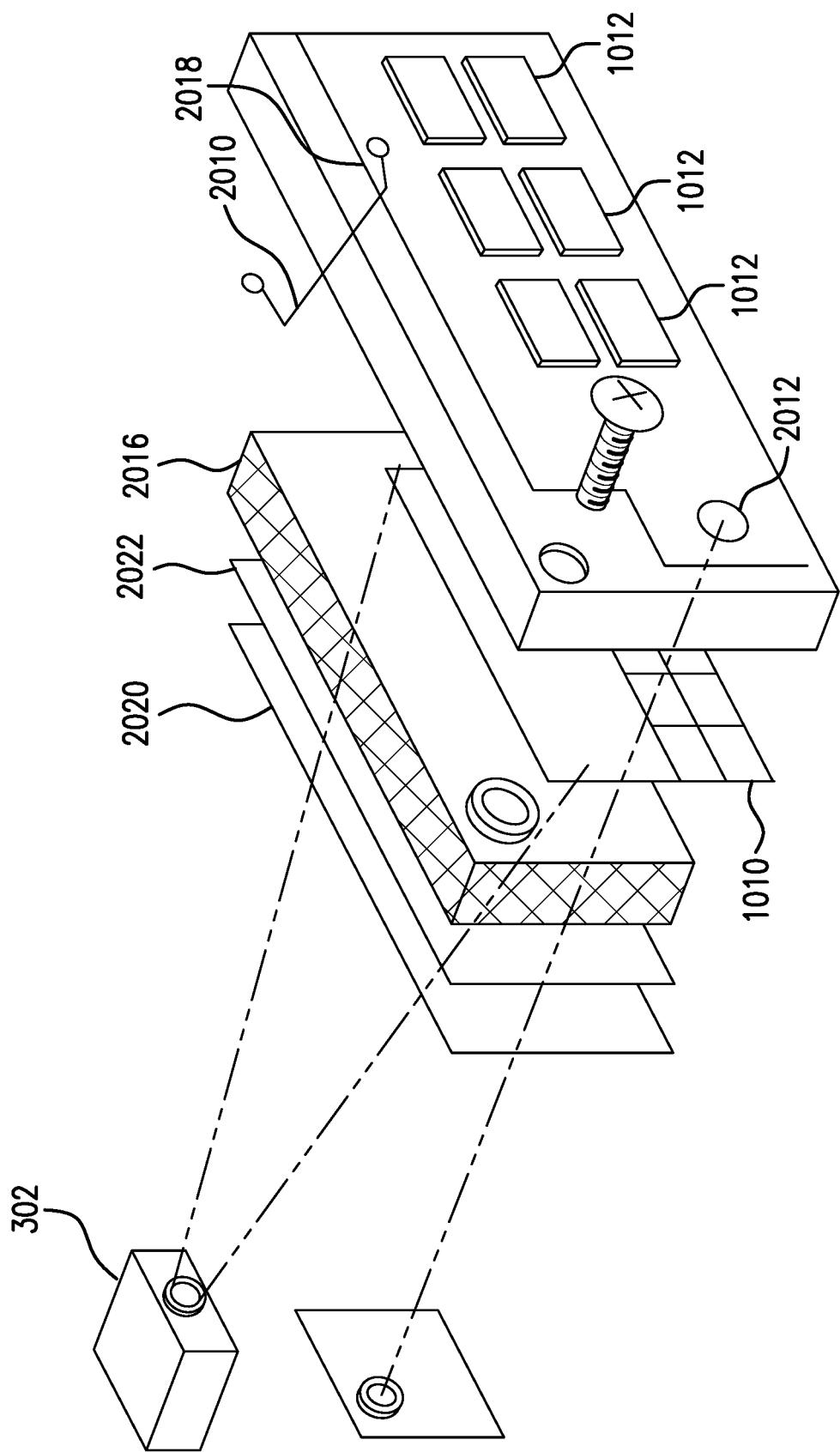
FIG. 10 illustrates an exemplary embodiment of the present invention.

FIG. 10 is a magnified cross-section of an exemplary wireless tactile panel. In the illustration of FIG. 10, a plurality of tactile elements 1012, such as the secondary hardware discussed above, are provided. These elements may be connected, such as via wires, traces, or other connectors 2010, to a plurality of signal-generating electronics, such as wireless transceivers, as mentioned above. In addition to the disclosed embodiments above, power may be provided to such embedded electronics and tactile elements via solar-powered electronics embedded at 2018. This solar power may be provided, for example, from a solar cell layer that may comprise multiple solar cells 1010. This solar cell layer may receive the light energy projected by projector 302, such as through no, one, or more additional layers provided to receive or pass the projection, such as a rear projection film 2020, a rear touch screen film 2022, and/or a flexible and mounted glass layer 2016, by way of example. Any one or more of these additional layers may also be provided with power, such as via power traces, based on power stored from solar cell layer 1010. The manner of converting received light energy to power will be apparent to the skilled artisan and is thus not discussed in detail herein.

Figure 11:
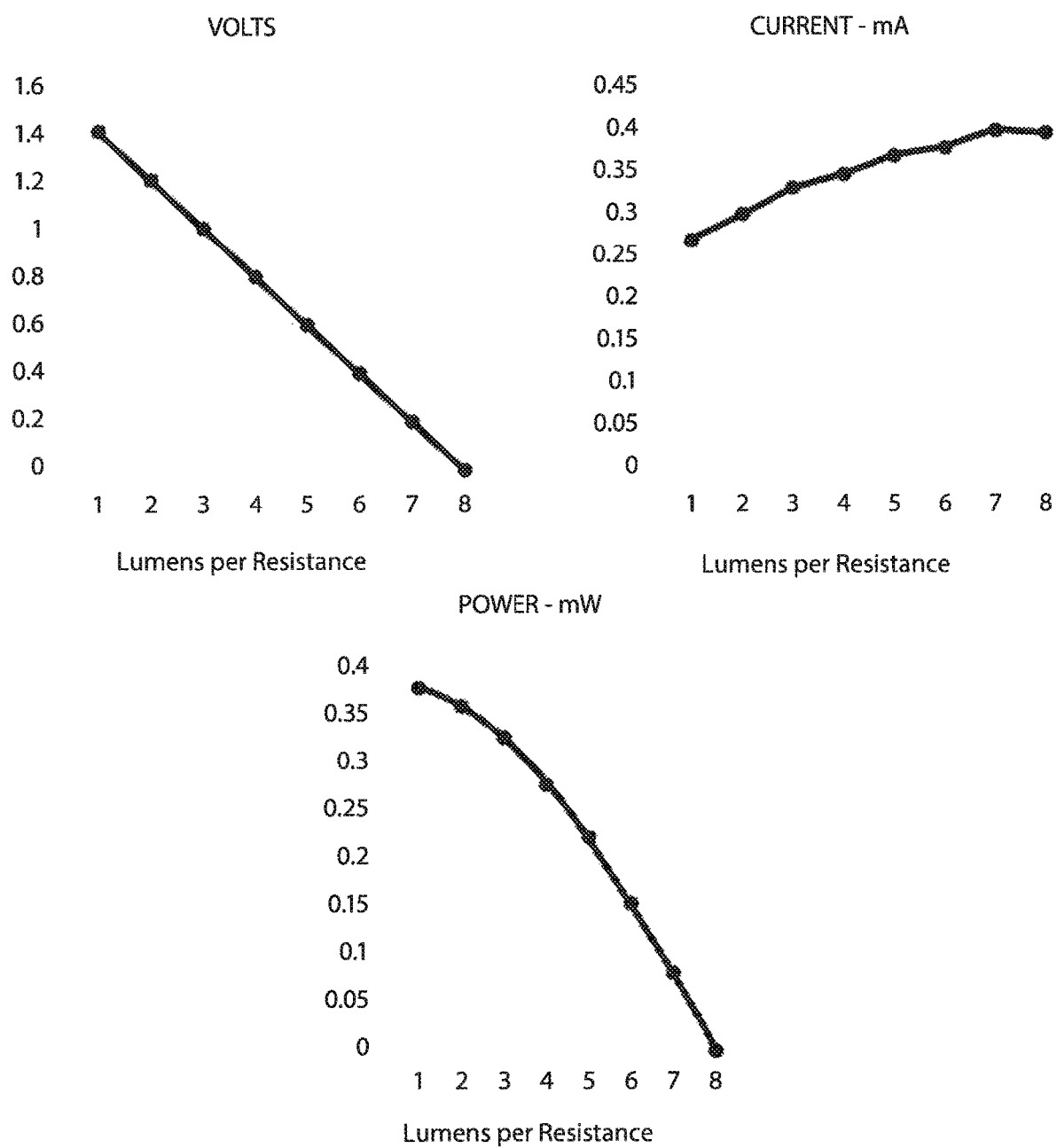
FIG. 11 is a series of graphs of exemplary power use of the system in accordance with herein described systems and methods.

FIG. 11 illustrates a variety of voltage/current/power generation curves, wherein the voltage/current/power is generated responsive to received lumens. As shown, the volts, current, and total power received vary in accordance with the lumens provided to the receiving solar cells based on the resistive load on the energy transfer path. In short, the power linearization indicated may be produced by providing a given fixed light energy source and varying the load resistor to achieve the linear output voltage form.

As the voltage/current/power generated is responsive to received lumens, maximum optical power may be received at the center of the projected display, as the maximum lumens may be provided to the display pane(s) from the projector along the center axis of the projection. Further, the optical power transfer provided from the projector may, if subsequent power is generated, enable a wireless data transfer path, wherein the power transferred wirelessly allows for an optical data transfer back to a computer associated with housing 502. Moreover, optical power transfer may not only allow for wireless operation of various control panel components, but may further allow for charging of panel energy storage components, such as batteries or super capacitors, whereby powered operation may be enabled by the power stored, rather than by an optical power transfer.

Because of the limited power available through optical power transfer, it may be preferred that the processor, components, and electrical paths associated with wireless tactile panels be ultra-low power. As will be understood by the skilled artisan, energy and data transfer may occur based on optical line of sight, or may be performed through various media or user optical directive components.

Various solar cells and optical power transfer cell types, or like energy gathering devices, may be deployed in embodiments of the present invention, as will be apparent to those of ordinary skill in the pertinent arts in light of the teachings herein. For example, monocrystalline solar cells, such as SLMD481H10L (capable of 5 volts at 200 mA in FULL SUN (approx. 100,000 LUMENS)) and/or SLMD121H10L (capable of 5 volts at 50 mA in FULL SUN (approx. 100,000 LUMENS)), may be particularly suitable for use in the disclosed embodiments. The use of such self-powering techniques may be viable even at typical ambient fluorescent room lighting of 200-300 lumens.

In an embodiment of the present disclosure, optical power transfer may be performed by using the center of the projected screen and white light, which may result in maximum spectral content and maximum power conversion at the power collection point. This is additionally the optimal power collection point because multiple projections may overlap at the center of the screen. In conjunction, these factors may provide, at screen center, a yield in the range of 0.5-3 V @ 0.5-3 mA, such as a yield of at least 2.44 V @ 2.44 mA, for example.

Consequently, in view of the fact that about 2.44 V at 2.44 mA may be provided using the disclosed optical power transfer embodiments, more than enough voltage to operate tactile equipment in association with the disclosed display pane projections may be provided, as minimum voltage for such components may be in the range of 1.7 volts. By way of non-limiting example, specific components may include simple switches, such as with correspondent respective power/voltage requirements of approximately 0V.

Moreover, as the tactile equipment generally requires 100 micro amps or less, and the present invention may provide 2.4 milliamps or more, more than sufficient current is available to operate tactile components. By way of non-limiting example, specific components may include simple switches, such as with correspondent respective current requirements of approximately 0 amps.

Further, processing circuits, such as an ARM micro-chip, may receive more than sufficient power to provide operability in the displays disclosed herein, particularly in optical power transfer embodiments. By way of non-limiting example, specific processors may include STM32L476RG, such as with correspondent respective power requirements of 1.7V and 0.000303 amps @ 2 MHz.

Figure 12:
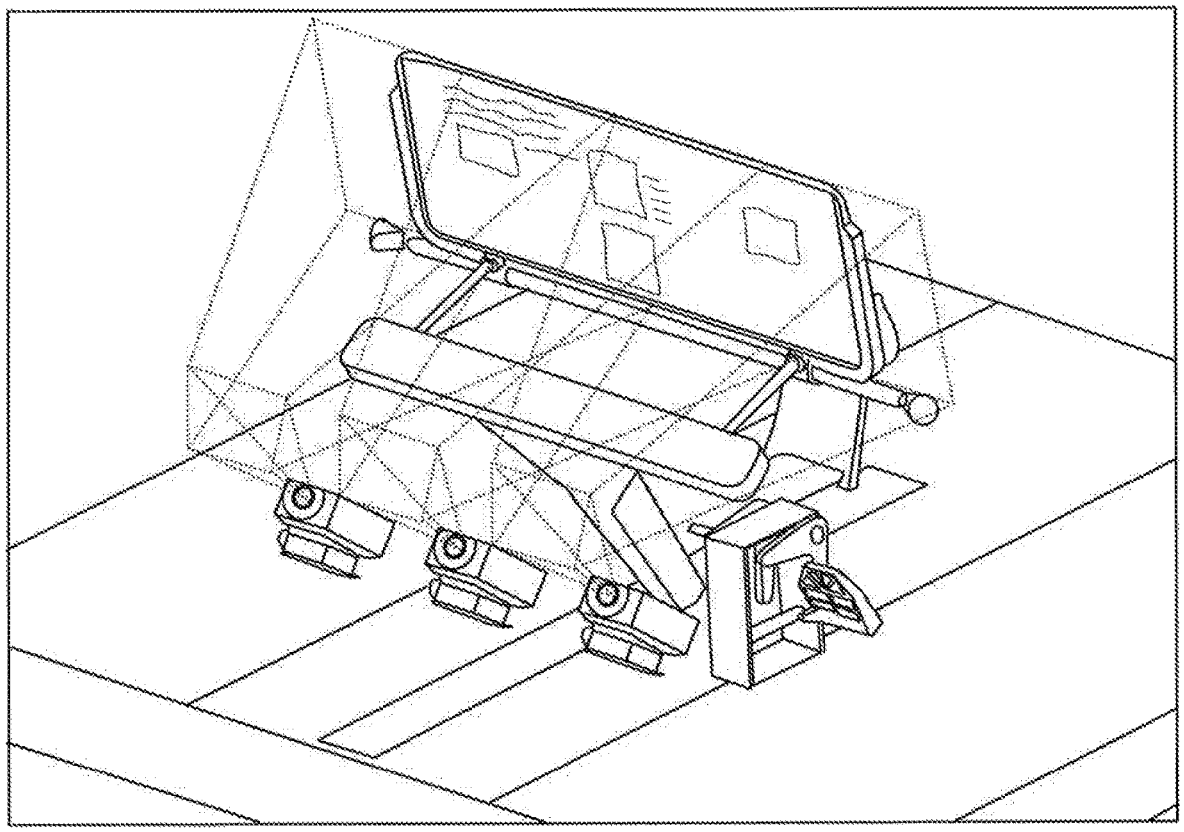
FIG. 12 illustrates an exemplary embodiment of the present invention.
Figure 13A:
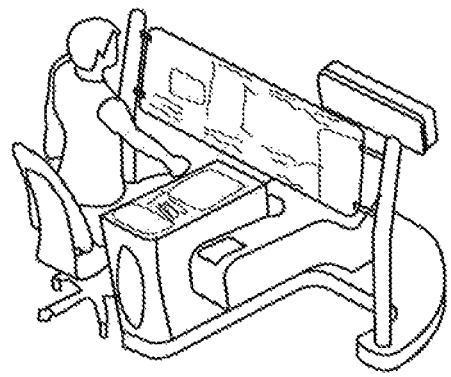
FIGS. 13A-B illustrate exemplary embodiments the present invention.
Figure 13B:
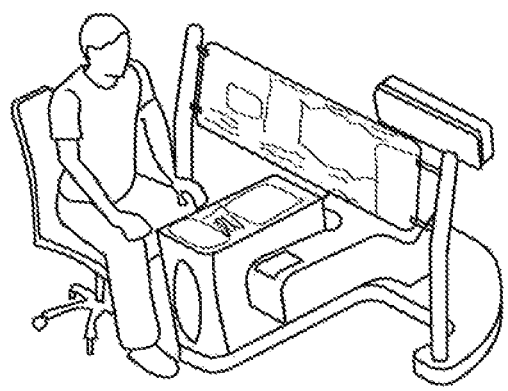

FIG. 12 illustrates a multi-projector, such as a three projector, exemplary embodiment, wherein the multiple projectors may operate in a manner similar to the multi-projector embodiment illustrated in FIG. 4C. In the embodiment of FIG. 12, power may be provided through the structural support holding panels 304 and 306, or, alternatively, may be provided wirelessly, such as using the disclosed methodologies, such as including embedded solar cell layers. The optical power cell layers may be positioned to optimally receive power individually from each of the projectors provided in FIG. 12, or to receive optimal power from the projectors in FIG. 12 in combination.

As is evident in FIG. 12, beam overlap occurs at the receiving display, particularly at the center of the display at which point the center axis of the received beam from the middle projector resides as do overlapping beams from each of the two side projectors. In short, the skilled artisan will appreciate, in light of the discussion herein, that the optical energy receiver layer/cells may be optimally placed so as to receive optimum power from the projector or projectors in exemplary embodiments, as referenced above. Needless to say, power optimization may also be performed by the software discussed throughout, such as in conjunction with the projection blending of multiple projections discussed above. Such power optimization may include, for example, blending of power from multiple available sources, such as wherein the optical energy reception is insufficient to run a particular secondary hardware, and consequently battery power or plug power is drawn.

FIGS. 13A, 13B, 14A, and 14B illustrate particular exemplary embodiments of flight training devices for use in exemplary training methodologies in the disclosure. In the illustrative embodiments, simulation and training tasks may be provided through the use of physical flight controls, tactile panels, and at least one visual system. This may allow for training not only at training facilities (such as in satisfaction of FAA regulations), but also in other environments, such as at home, at airports, at hotels, at libraries, at temporary training sites, and the like. The training provided may enable any of a myriad of necessary and desirable aspects of heavy equipment training, such as environment/cockpit familiarization, maintenance training, engineering training, interactive courseware and materials, and self-paced instruction, learning and results testing.

More specifically, smaller scale or in-home facilities may be provided with simple glass/acrylic tables/center pedestals, which may include the functionality provided herein, such as when used in conjunction with a small scale projection system(s). Such interactive aspects (in addition to those others discussed herein throughout) may not only provide substantial commonality with a cockpit environment, but may also provide charts, maps and weather, and performance calculations, and/or may provide review materials, may make available manuals, may provide "refresher" summaries and testing, and the like. Moreover, small scale training and test systems may be interactive with common consumer electronics, such as wherein an iPad or like tablet computer wirelessly links, or links via wire, using the embodiments disclosed herein to act as cockpit equipment in a training context, such as by acting as the steering yoke to fly the simulated airplane.

Figure 14A:
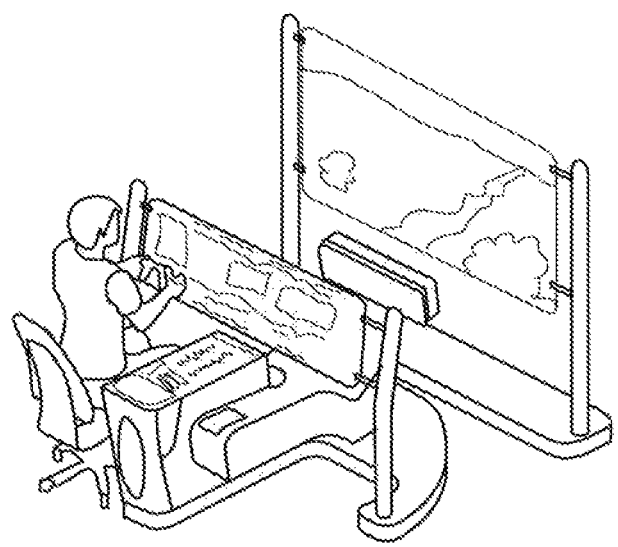
Figure 14B:
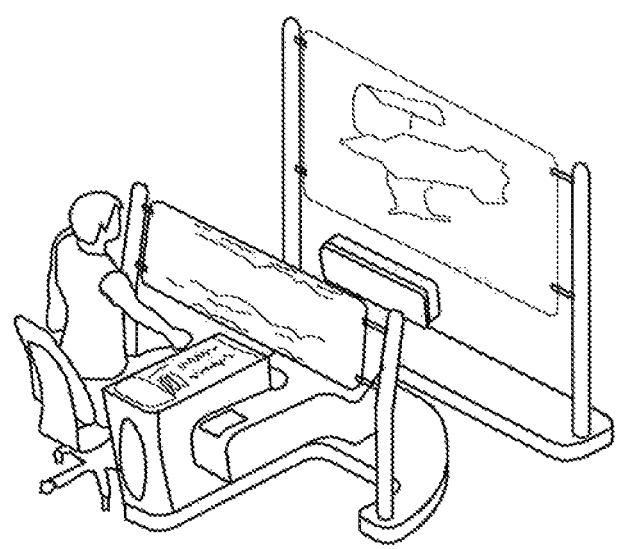

Moreover, and as illustrated with particularity in FIGS. 14A and 14B, the projection system of the present disclosure may provide a multi-directional projection, such as wherein some projected aspects are used to provide a simulated cockpit environment, and/or other projected aspects are used to provide an "outside the cockpit windshield" environment. Needless to say, in such embodiments, the operability of the simulated cockpit may be linked, such as by the software controlling the projections, so that the environment outside the window corresponds to the simulated environment projected on the cockpit equipment. By way of non-limited example, an altimeter projected cockpit display may be linked to show a particular altitude that is evidenced by looking through the simulated windshield of the simulation environment.

Of note, the cockpit window experience discussed hereinthroughout, where present, may be provided via a simulation as discussed throughout, or maybe a "mated," or linked as mentioned above, aspect of the simulation but provided on a separate screen. For example, the cockpit "window" may constitute a large screen, such as having any actual cockpit dividers therein, that is offset in depth from the simulated cockpit controls. Thereby, the user may experience a depth perception as she will experience in the actual cockpit. Moreover, the cockpit "window" may constitute a non-touch or any other type of screen, such as an LCD, LED, CRT, or any other like display screen.

Figure 15A:
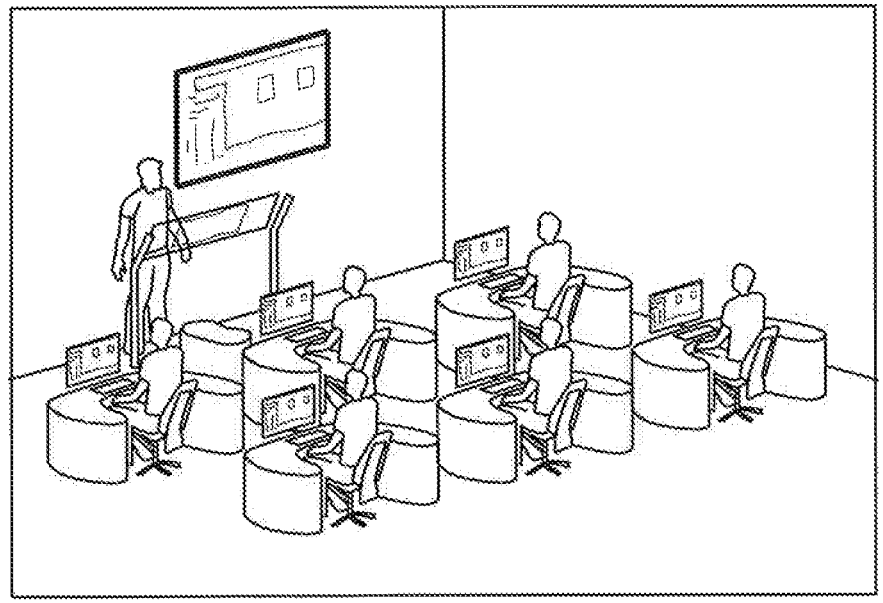
Figure 15B:
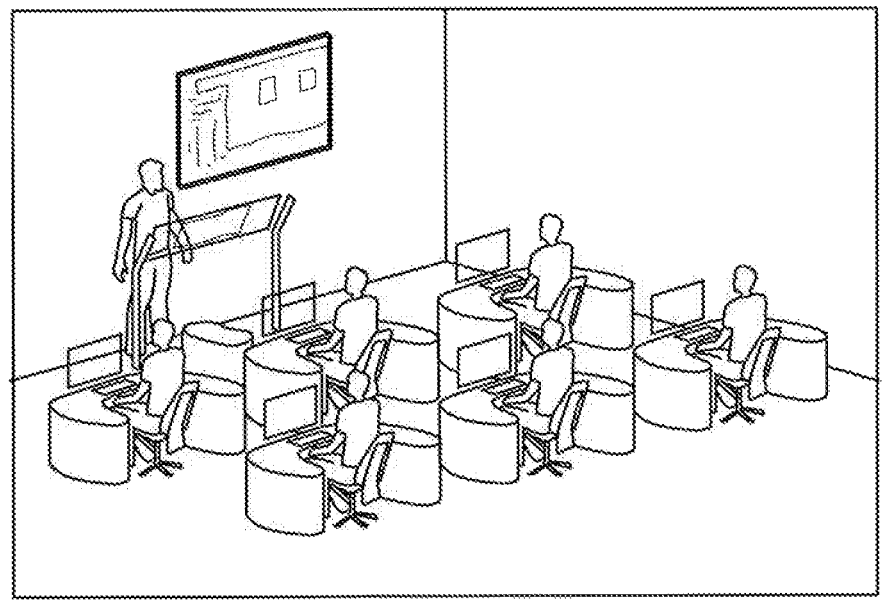

FIGS. 15A and 15B illustrate classroom-based training embodiments that make use of ones of the disclosed aspects. In the illustrations, projection aspects and/or optical elements as disclosed herein throughout, may be embedded, for example, in one or more desks in a classroom setting. That is, the desks may serve the same or a similar function to that of housing 502. In the illustrations, FIG. 15B illustrates a classroom setting in which no projections are made onto the interactive display, i.e., the display panel is clear. On the contrary, FIG. 15A illustrates the projection of training or simulation aspects onto a small display in front of each student in the classroom. The skilled artisan will appreciate, in light of the discussion herein and alternatively to the illustrations of FIG. 15, that students in a given classroom may or may not be receiving the same projection. Moreover, projections may be varied in accordance with numerous factors, such as variations by the students in the pace of moving through a training exercise.

Yet further, and as indicated in the exemplary embodiments of FIGS. 15A and 15B, each student's display panel may have tactile aspects, and may or may not be communicatively linked with a teacher's simulation display panel, and/or with one or more other screens in the same local environment. Such other may provide "windshield" environmental scenes, or the like. Needless to say, the one or more windshield scenes may also be or not be linked to one or more of the student's training panels, and/or to the teacher's training panel. It almost goes without saying that student-based training panels may be sized and shaped to mimic actual cockpit size and shape as discussed herein throughout, or may be scaled down in size and shape to accommodate a certain number of screens in a given environment. Scale factors for the training systems may or may not be predetermined, and scale requirements may be understood by those skilled in the pertinent arts.

Advantageously and as illustrated in FIGS. 15A and 15B, synchronizing of projections onto individual student screens may allow for periodic deactivation of those screens, such as by an instructor. In such circumstances, deactivation of a student screen to a substantially clear embodiment, such as that evidenced in FIG. 15B, may allow for a more unobstructed view of the instructor, the instructor's display, in-room displays, such as windshield scenes, and aspects of a classroom generally, by way of non-limiting example.

Figure 16:
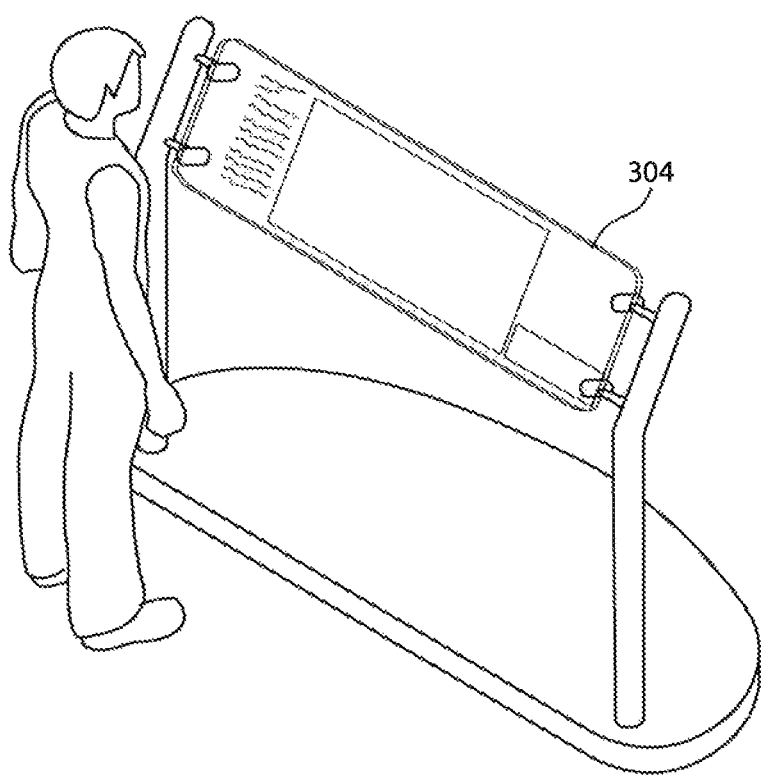
FIG. 16 illustrates an exemplary embodiment of the present invention.

FIG. 16 illustrates an exemplary classroom setting, such as that provided in FIGS. 15A and 15B, from the perspective of a classroom instructor. As shown, the instructor may be provided with instruction materials, and/or with the ability to change instructional materials presented to one or more of the student displays, including changes in the tactile-based training format discussed herein throughout. Although the instructor work station is illustrated with only panel 304 from previously-discussed embodiments, those skilled in the art will appreciate, in light of the discussion herein, that one or more additional panels, such as substantially horizontal panel 306, as well as one or more console panels, panel equipment, buttons, other interactive aspects, or the like may additionally be provided at the instructor work station.

The embodiments of FIG. 15 and FIG. 16 may be extended to home-based training, such as using mobile devices. In such embodiments, a user may be in possession of an acrylic screen for projection as discussed previously, or may use one or more of a personal or desktop computer screen, a laptop, a touch screen display, a television set, a mobile device, a tablet computer, or the like in order to receive the simulations and training discussed herein throughout. Thereby, students may receive training at home, in a hotel, or at any other location, as will be understood to the skilled artisan in light of the disclosure herein.

Figure 17A:
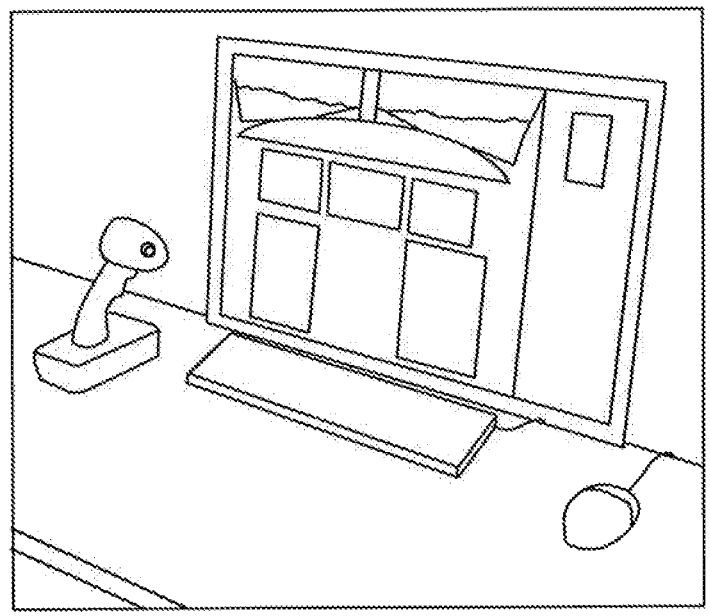
FIGS. 17A-B illustrate exemplary embodiments of the present invention.
Figure 17B:
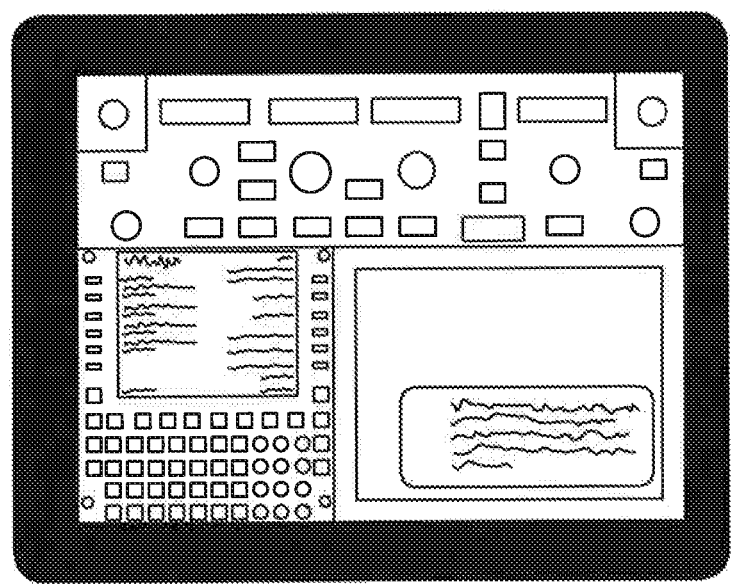

More particularly, FIG. 17A illustrates the exemplary display of a cockpit on a personal computer display screen. Of note, the screen may be a touch screen, or may be a simple passive display. Of further note, the illustrated cockpit equipment may also be communicatively linked from the display to an additional computing device, such as wherein a mouse, joystick, tablet computer, mobile device, or the like may serve as the yoke with which the user trains to fly the simulated aircraft for which the equipment is displayed on the computing screen. A particular training embodiment, which additionally includes the display of training information overlaid upon cockpit equipment, is shown in FIG. 17B.

Accordingly, and as indicated throughout, the disclosed embodiments may allow for a simulation and training system to simulate the operation of, for example, heavy equipment, such as an airplane. More particularly, on-site training, such as using the large scale, seamless interface, acrylic projection panels discussed throughout, may be used in conjunction with classroom-based training that employs, for example, scaled simulation versions of the large scale training equipment. Moreover, such simulation-training aspects may also be integrated for use with at-home, dedicated training equipment, such as an in-home projection system with a clear acrylic touch panel system as disclosed herein. Likewise, rather than dedicated, in-home projection equipment, the disclosed training system may be integrated with typical at home or mobile electronics, such as laptop computer screens, desktop computer screens, televisions, mobile devices, tablet computers, and the like, which personal computing devices may also be linked to one another to provide optimal simulation embodiments.

Figure 18:
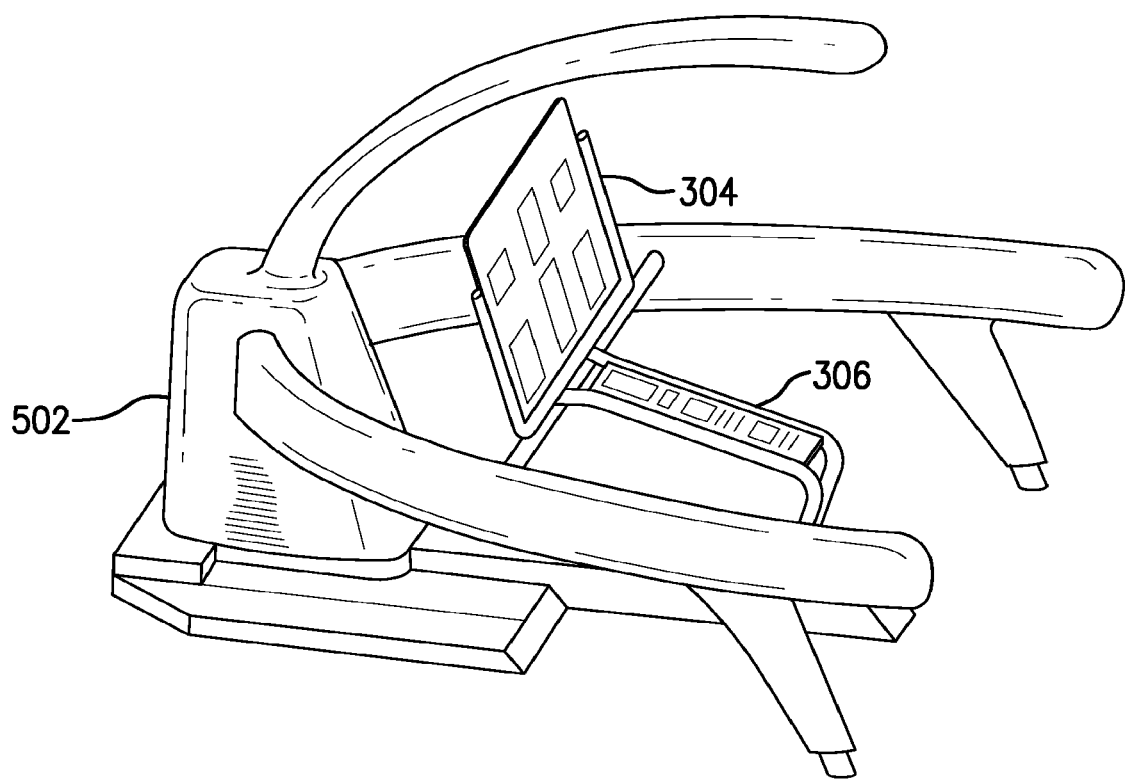
FIG. 18 illustrates an exemplary embodiment of the present invention.

FIG. 18 illustrates an additional and alternative embodiment of the disclosed large-scale training system. In the exemplary illustration, the instrument panel is simulated onto a single piece of clear acrylic, and the simulation comprises a projection emitting from housing 502. Moreover, panel 306 is provided in this exemplary embodiment simply as a projected, touch-based console. Further, in the illustration, because housing 502 includes housing extension arms around and above displays 304 and 306, aspects of the projection may be provided from the housing extensions for housing 502. For example, communication aspects immediately within the physical zone of a user may be provided in the housing extensions 502. For example, Wi-Fi, Bluetooth, Near Field Communication, and like communication aspects may be readily provided in the illustrated housing extensions. Of course, such functionality may also be provided elsewhere in the local environment of housing 502, and/or within the main portion of housing 502.

It will be understood to those of ordinary skill in the art, in light of the discussion herein, that additional aspects, such as physical equipment or buttons, tablet computers, or the like may be provided in conjunction with the illustrative embodiment of FIG. 18, such as to simulate cockpit equipment, such as the yoke of an aircraft. Of note, the disclosed embodiments, such as that of FIG. 18, may be modular and scalable, and may also be provided in a tactile format, may be provided for use with external communication devices, such as tablet computers, or may be provided in like manners.

Further, the modularity of the embodiments referenced in relation to the exemplary embodiment of FIG. 18 may allow for enhanced ease of use over the known art. For example, the lack of wires needed for intercommunication between the elements disclosed herein may allow for minimum need to "plug in" or otherwise wire aspects of the invention. Accordingly, blocks/modules 2010 of the invention may be designed to simply click and lock together using locking mechanisms 2012, such as using quick release locking handles or the like, without needing to run, or with minimal need to run, wires in order to provide a simulation, as illustrated in the exemplary embodiment of FIG. 19. Moreover, one or more such modules 2010 may have associated therewith, by way of nonlimiting example, wheels 2014 to allow the discreet modules to be readily moved about without concern over dragging wires. Further, by way of example, on-board computer, cameras, and the like may be embedded within certain modules and have any requisite wiring associated therewith run discretely within only that module.

In fact, the ability to modularly lock and unlock various panels, seats, hardware, and other aspects of the disclosed embodiments also lends itself to the scalability discussed herein throughout. For example, side panels may be added to a cockpit, such as for a wraparound effect, such as using the same lock and unlock handle system discussed immediately above. Thus is provided a modular and mobile heavy equipment training system, according to the embodiments.

Figure 19:
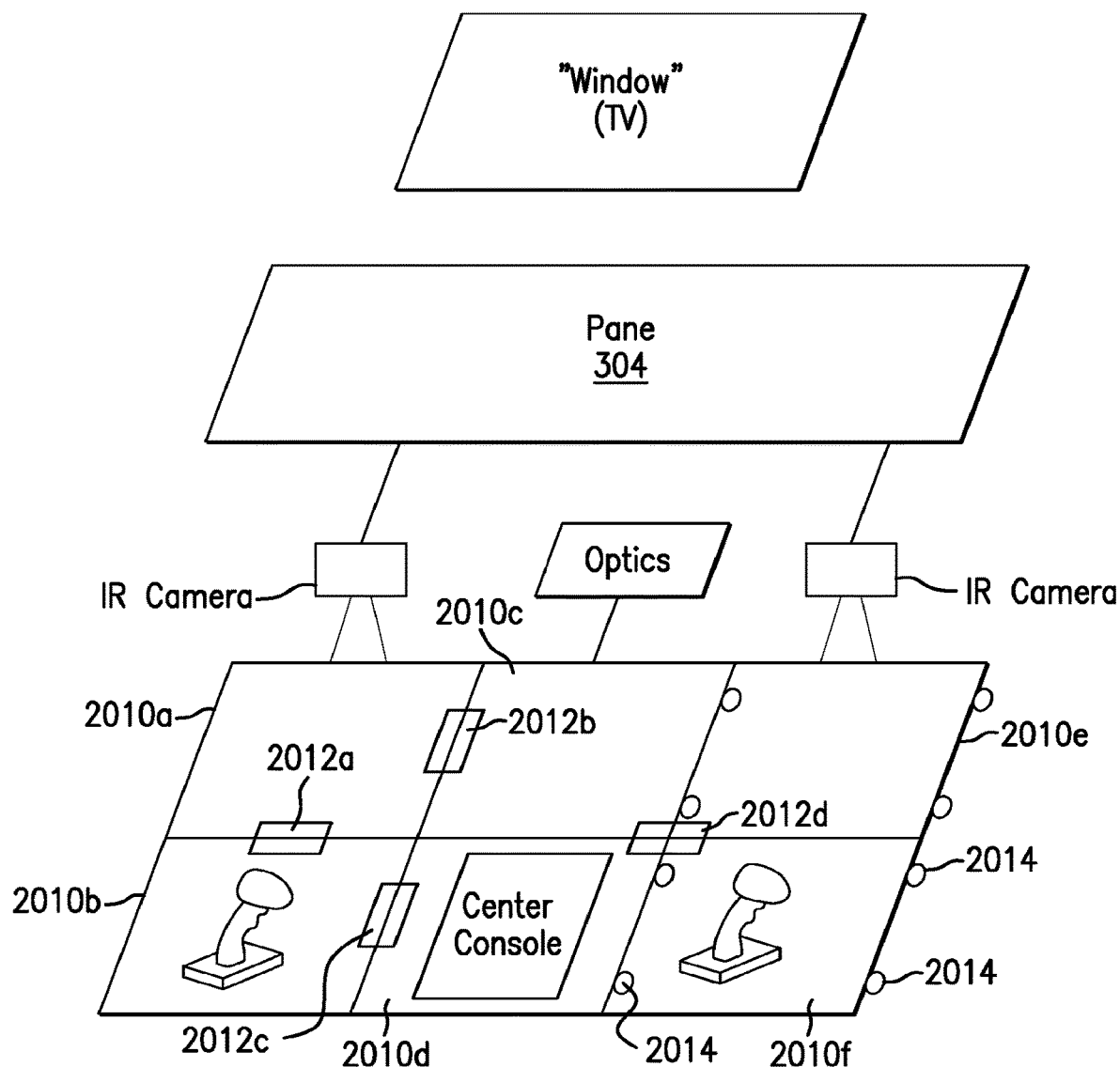
FIG. 19 illustrates an exemplary embodiment of the present invention.

The swappable and modular nature of the embodiments, as illustrated in FIG. 19 may allow for the providing of on-board batteries to allow for operation of certain modules, rather than necessitating that those modules be plugged in to, for example, a wall outlet. Needless to say, such batteries may be rechargeable and/or interchangeable.

Accordingly, the instant embodiments provide significant optionally heretofore unknown in the existing art. For example, the software provided may be agnostic or normalizable to any known operating system, such as to allow for the aforementioned modularity, and therefore may be run on nearly any device suitable to provide interactivity, such as via touch, mouse, infrared pointer, motion-sensing, or the like, for a user. That is, the embodiments may be employed on, by way of nonlimiting example, the disclosed full simulation or entertainment system, a tablet computer, a desktop computer, a television screen, a gaming system, such as a Nintendo Wii, Wii U, or Microsoft Xbox, or the like. Moreover, the agnostic nature of the software and the ability to use the simulation on different devices makes the disclosed embodiments scalable. That is, the embodiments may be employed with the disclosed single-pane projection and touch screen methodology, a full software-backed tactile hardware cockpit, or the like. Therefore, the user experience may be high-fidelity or low-fidelity at least in that a simulation may, for example, be provided for lower or elementary level training, such as in a user's home, and such as in preparation for higher level training or testing, i.e. higher-fidelity training.

Yet further, the physical components and modularity of the disclosed embodiments also allow for multi-purpose use and scalability, as will be understood by the skilled artisan in light of the discussion herein. For example, components may be removed or not included in the simulation system, other than the center console, which may be used as, for example, a training table, with or without hardware and/or projection systems operable therein. In this and similar embodiments, and by way of nonlimiting example, electrochromatic glass may be employed for the table, such as wherein the glass may be darkened or colored to allow its use as an actual table, and wherein actuation of the electrochromatic glass may allow for the projection to be visible therethrough and the touch screen aspects to be accordingly operable.

Those skilled in the pertinent arts will appreciate, in light of the discussion immediately above, the various additional uses that may be provided by a modular system, and particularly by a modular, such as a series of single-panes, touch system. For example, the embodiments may provide a center console that may also serve as: a design table, such as for avionics design; a medical field training table, such as for surgical training, including training for eye surgery; and the like. These variable uses are provided based on the fact that, unlike a capacitive touch screen, the IR or near-IR touch screen disclosed herein may be cut to any size or shape, and may have any number of holes cut therein and/or hardware protrusions therefrom. Needless to say, not only are these elements not available with capacitive touch screens, but further these elements are not available using LCD, LED, CRT, or any other similar display screens.

Returning now particularly to the embodiment detailed in FIG. 18, in conjunction with the extended housing illustrated in FIG. 18 and with others of the various exemplary embodiments discussed throughout, the disclosure may also provide for optical imagining, i.e., such as gesture recognition, for pilot interaction with a flight training device, such as discretely from the IR or near-IR functionality detailed herein above. Generally, for touch detection, a common graphical flight training device may use electronic resistive or capacitive technology, integrated within LCD monitors. To implement this technology, a prohibitively expensive touch foil must be applied. Alternatively, in an embodiment of the present invention, use of optical imagining technology may be used to determine pilot intention within the flight training device. For example, an array of visual (or, as referenced above, infrared) cameras, or like sensors, may be embedded in the armatures illustrated for housing 502 in FIG. 18 (or elsewhere in the immediate environment of the cockpit simulation), and may sense and track the pilot's hands and fingers to determine when and where the graphical cockpit panels are being touched.

Those of skill in the art will appreciate that the herein described systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

What is claimed is:

1. A simulated cockpit training system suitable for simulating a cockpit, comprising:
   at least one large, clear, seamless flat pane sized and shaped to at least partially present an approximation of physical portions of the cockpit;
   at least one projector capable of backprojecting, via an optical path comprising at least one optical element, a simulation of the cockpit onto the at least one large, clear seamless flat pane;
   at least one tactile aspect, at least partially on a secondary seamless pane discrete from the at least one substantially seamless pane, interactively provided by backprojecting in association with the simulation;
   at least one processor having communicatively associated therewith non-transitory computing code for at least partially providing the simulation and the backprojection of and the interaction with the at least one tactile aspect, and further for enabling at least one training feature to be at least partially overlaid on the backprojected simulation.

2. The system of claim 1, wherein the at least one pane comprises at least two panes.

3. The system of claim 1, wherein the at least one pane comprises one of glass and an acrylic.

4. The system of claim 1, wherein the at least one optical element comprises at least one beam folding mirror.

5. The system of claim 1, wherein the cockpit is that of an airplane.

6. The system of claim 1, further comprising at least one physical support for the at least one pane.

7. The system of claim 6, wherein at least one of the at least one projector, the at least one optical element, and the at least one tactical element are associated with the at least one physical support.

8. The system of claim 1, wherein the at least one projector comprises an LED high definition projector.

9. The system of claim 1, wherein the at least one tactile aspect comprises at least one of a button, a light, a switch, a yoke, a wheel, and a joystick.

10. The system of claim 1, further comprising at least one power supply, communicative with and physically associated with the at least one large, clear, seamless pane and suitable to provide power to at least the at least one tactile aspect.

11. The system of claim 10, wherein the at least one power supply comprises at least one wireless power receiver.

12. The system of claim 11, wherein the wireless power receiver comprises a plurality of solar cells, and the receiving comprises received power at least from illumination provided by the at least one projector.

13. The system of claim 11, further comprising a plurality of low-power interconnections physically associated with the seamless pane for interconnecting elements for receiving power from the at least one power supply, wherein at least one of the elements for receiving power comprises the at least one tactile aspect.

14. The system of claim 11, wherein at least one of the at least one tactile aspects comprises a low-power element.

15. The system of claim 14, wherein at least one of the at least one low power tactile aspects comprises at least one selected from a capacitive touch element and a depressible contact.

16. The system of claim 11, wherein at least one of the at least one processors comprises a low power processor physically contacted with the at least one seamless pane.

17. The system of claim 11, wherein the seamless pane further comprises at least one low power wireless transceiver for communicating with a remote one of the at least one processor.

18. The system of claim 11, wherein the at least one wireless power receiver is positioned in association with the seamless pane so as to be optimally in the optical path of the backprojection.

19. The system of claim 1, wherein the at least one training feature comprises a training manual.

20. The system of claim 1, wherein the at least one training feature comprises engineering detail on one or more aspects actuated from simulated cockpit.

21. A simulated cockpit training system suitable for simulating a cockpit, comprising:

a plurality of seamless, at least partially clear flat panes;

at least one projector corresponded to each of the plurality of panes and capable of backprojecting, via an optical path comprising at least one optical element, a backprojected simulation of a different aspect of the cockpit onto each of the panes;

at least one processor having communicatively associated therewith non-transitory computing code for at least partially providing, discretely to at least two of the plurality of panes, of the backprojected simulation and for enabling at least one training feature to be at least partially overlaid on the discretely-provided backprojected simulation.

\* \* \* \* \*